US012586977B2

(12) United States Patent
Weigel et al.

(10) Patent No.: US 12,586,977 B2
(45) Date of Patent: Mar. 24, 2026

(54) METHOD AND APPARATUS FOR MEASURING A TIME DELAY BETWEEN PAIRS OF PULSES FROM LASER PULSE SEQUENCES, AND APPLICATIONS THEREOF

(71) Applicants: Max-Planck-Gesellschaft zur Foerderung der Wissenschaften e. V., Munich (DE); Ludwig-Maximilians-Universitaet Muenchen, Munich (DE)

(72) Inventors: Alexander Weigel, Munich (DE); Theresa Buberl, Garching (DE); Ferenc Krausz, Garching (DE); Ioachim Pupeza, Tuerkenfeld (DE)

(73) Assignees: Max-Planck-Gesellschaft zur Foerderung der Wissenschaften e.V., Munich (DE); Ludwig-Maximilians-Universitaet Muenchen, Munich (DE)

( * ) Notice: Subject to any disclaimer, the term of this patent is extended or adjusted under 35 U.S.C. 154(b) by 222 days.

(21) Appl. No.: 18/268,710

(22) PCT Filed: Dec. 22, 2020

(86) PCT No.: PCT/EP2020/087657
§ 371 (c)(1),
(2) Date: Jun. 21, 2023

(87) PCT Pub. No.: WO2022/135698
PCT Pub. Date: Jun. 30, 2022

(65) Prior Publication Data
US 2024/0039235 A1     Feb. 1, 2024

(51) Int. Cl.
H01S 3/13          (2006.01)
G01N 21/3586     (2014.01)
H01S 3/00          (2006.01)

(52) U.S. Cl.
CPC ....... H01S 3/1307 (2013.01); G01N 21/3586 (2013.01); H01S 3/0057 (2013.01); H01S 3/0078 (2013.01); H01S 3/1305 (2013.01)

(58) Field of Classification Search
CPC .............. G01N 21/3586; G01N 21/35; G01N 21/3581; H01S 3/1307; H01S 3/0057; (Continued)

(56) References Cited

U.S. PATENT DOCUMENTS

| | | | |
|---|---|---|---|
| 2005/0168735 A1* | 8/2005 | Boppart ................. | G01N 21/65 356/301 |
| 2009/0303574 A1* | 12/2009 | Gunter ................. | G02F 1/3515 359/328 |

(Continued)

OTHER PUBLICATIONS

Apolonski et al. (2000). Controlling the phase evolution of few-cycle light pulses. Physical Review Letters, 85(4), 740-743.
(Continued)

*Primary Examiner* — Sang H Nguyen
(74) *Attorney, Agent, or Firm* — Caesar Rivise, PC

(57) ABSTRACT

A laser pulse sequence measuring method for measuring a delay between a pair of pulses from two laser pulse sequences (1, 2), comprises the steps of creating a first laser pulse sequence (1) of first laser pulses (1A) and a second laser pulse sequence (2) of second laser pulses (2A), and generating a delay signal (3) which represents the delay between the pair of pulses from the first and second laser pulse sequences (1, 2), wherein the step of generating the delay signal (3) includes creating intra-pulse difference frequency generation (IPDFG) pulses (4) by applying intra-pulse difference frequency generation to the first laser pulses (Continued)

(1A) in a difference frequency generation (DFG) medium (21), providing phase-stable reference waveforms (5) based on the IPDFG pulses (4), and electro-optic sampling (EOS) of the electric field of the phase-stable reference waveforms (5) with sampling pulses (6) in an EOS medium (22), wherein the sampling pulses (6) are created based on the second laser pulses (2A), for generating an electro-optic sampling (EOS) signal (7), wherein the delay signal (3) is obtained from the EOS signal (7). Furthermore, a spectroscopic measuring method, a laser pulse sequence measuring apparatus (100) and a spectroscopic measuring apparatus are described.

47 Claims, 6 Drawing Sheets

(58) Field of Classification Search
CPC .... H01S 3/0078; H01S 3/1305; H01S 3/0092; H01S 3/10053; H01S 3/1304; H01S 3/2383
See application file for complete search history.

(56) References Cited

U.S. PATENT DOCUMENTS

| | | | |
|---|---|---|---|
| 2010/0171952 A1* | 7/2010 | DeFlores | G01N 21/35 356/331 |
| 2013/0050693 A1* | 2/2013 | Villeneuve | G01J 3/44 356/402 |
| 2013/0258343 A1* | 10/2013 | Zhu | G01N 21/31 356/402 |
| 2018/0003623 A1* | 1/2018 | Apolonskiy | C07D 231/12 |
| 2019/0267767 A1* | 8/2019 | Krausz | H01S 3/2383 |
| 2020/0033259 A1* | 1/2020 | Krausz | G01B 9/0201 |
| 2020/0064708 A1* | 2/2020 | Diddams | H01S 3/2391 |
| 2020/0109988 A1* | 4/2020 | Sterczewski | G01N 21/45 |

OTHER PUBLICATIONS

Baltuska et al. (2002). Controlling the carrier-envelope phase of ultrashort light pulses with optical parametric amplifiers. Physical review letters, 88(13), 133901:1-4.

Bartels et al. (2007). Ultrafast time-domain spectroscopy based on high-speed asynchronous optical sampling. Review of Scientific Instruments, 78(3), 035107:1-8.

Benedick et al. (2012). Optical flywheels with attosecond jitter. Nature Photonics, 6(2), 97-100.

Chen et al. (2018). A phase-stable dual-comb interferometer. Nature communications, 9(1), 3035: 1-7.

Chen et al. (2019). Mid-infrared feed-forward dual-comb spectroscopy. Proceedings of the National Academy of Sciences, 116(9), 3454-3459.

Coddington et al. (2016). Dual-comb spectroscopy. Optica, 3(4), 414-426.

Deschenes et al. (2010). Optical referencing technique with CW lasers as intermediate oscillators for continuous full delay range frequency comb interferometry. Optics Express, 18(22), 23358-23370.

Dietz et al. (2014). All fiber-coupled THz-TDS system with kHz measurement rate based on electronically controlled optical sampling. Optics letters, 39(22), 6482-6485.

Elzinga et al. (1987). Pump/probe method for fast analysis of visible spectral signatures utilizing asynchronous optical sampling. Applied optics, 26(19), 4303-4309.

Fellinger et al. (2019). Tunable dual-comb from an all-polarization-maintaining single-cavity dual-color Yb: fiber laser. Optics Express, 27(20), 28062-28074.

Abstract for Fritsch et al. (2019). High-power dual-comb thin-disk oscillator. In The European Conference on Lasers and Electro-Optics (p. ca_5_2). Optica Publishing Group.

Fueloep et al. (2012). Generation of sub-mJ terahertz pulses by optical rectification. Optics letters, 37(4), 557-559.

Gaida et al. (2018). Watt-scale super-octave mid-infrared intrapulse difference frequency generation. Light: Science & Applications, 7(1), 94: 1-8.

Gallot et al. (1999). Electro-optic detection of terahertz radiation. Josa B, 16(8), 1204-1212.

Hochrein et al. (2010). Optical sampling by laser cavity tuning. Optics Express, 18(2), 1613-1617.

Hou et al. (2015). Timing jitter characterization of mode-locked lasers with <1 zs/√Hz resolution using a simple optical heterodyne technique. Optics Letters, 40(13), 2985-2988.

Jones et al. (2000). Carrier-envelope phase control of femtosecond mode-locked lasers and direct optical frequency synthesis. Science, 288(5466), 635-639.

Kaneshima et al. (2016). Waveform characterization of CEP-stable intense mid-infrared pulses generated via dual-wavelength OPA. In 2016 Conference on Lasers and Electro-Optics (CLEO) (pp. 1-2). IEEE.

Kim et al. (2010). High-speed terahertz time-domain spectroscopy based on electronically controlled optical sampling. Optics letters, 35(22), 3715-3717.

Kim et al. (2016). Ultralow-noise mode-locked fiber lasers and frequency combs: principles, status, and applications. Advances in Optics and Photonics, 8(3), 465-540.

Kliebisch et al.(2016). Ultrafast time-domain spectroscopy system using 10 GHz asynchronous optical sampling with 100 kHz scan rate. Optics Express, 24(26), 29930-29940.

Kolano et al. (2018). Single-laser, polarization-controlled optical sampling system. Optics Express, 26(23), 30338-30346.

Kowligy et al. (2019). Infrared electric field sampled frequency comb spectroscopy. Science Advances, 5(6), eaaw8794: 1-7.

Kray et al. (2010). Electronically controlled coherent linear optical sampling for optical coherence tomography. Optics Express, 18(10), 9976-9990.

Lessing et al. (2013). Suppression of amplitude-to-phase noise conversion in balanced optical-microwave phase detectors. Optics Express, 21(22), 27057-27062.

Liao et al. (2019). Active f-to-2f interferometer for record-low jitter carrier-envelope phase locking. Optics letters, 44(4), 1060-1063.

Link et al. (2017). Dual-comb spectroscopy of water vapor with a free-running semiconductor disk laser. Science, 356 (6343), 1164-1168.

Miura et al. (2002). Active synchronization of two mode-locked lasers with optical cross correlation. Applied Physics B, 75, 19-23.

Nagai et al. (2004). Generation and detection of terahertz radiation by electro-optical process in GaAs using 1.56 μm fiber laser pulses. Applied physics letters, 85(18), 3974-3976.

Peng et al. (2014). Balanced optical-microwave phase detector for sub-femtosecond optical-RF synchronization. Optics Express, 22(22), 27102-27111.

Pupeza et al. (2015). High-power sub-two-cycle mid-infrared pulses at 100 MHz repetition rate. Nature Photonics, 9 (11), 721-724.

Pupeza et al. (2020). Field-resolved infrared spectroscopy of biological systems. Nature, 577(7788), 52-59.

Reichert et al. (1999). Measuring the frequency of light with mode-locked lasers. Optics communications, 172(1-6), 59-68.

Rybka et al. (2016). Sub-cycle optical phase control of nanotunnelling in the single-electron regime. Nature Photonics, 10(10), 667-670.

Schibli et al. (2003). Attosecond active synchronization of passively mode-locked lasers by balanced cross correlation. Optics Letters, 28(11), 947-949.

Schubert et al. (2013). Rapid-scan acousto-optical delay line with 34 kHz scan rate and 15 as precision. Optics letters, 38(15), 2907-2910.

Schwarz et al. (2012). Active stabilization for optically synchronized optical parametric chirped pulse amplification. Optics express, 20(5), 5557-5565.

(56) References Cited

OTHER PUBLICATIONS

Schweinberger et al. (2019). Interferometric delay tracking for low-noise Mach-Zehnder-type scanning measurements. Optics Express, 27(4), 4789-4798.

Suess et al. (2016). New ultrarapid-scanning interferometer for FT-IR spectroscopy with microsecond time-resolution. Review of Scientific Instruments, 87(6), 063113:1-7.

Telle et al. (1999). Carrier-envelope offset phase control: A novel concept for absolute optical frequency measurement and ultrashort pulse generation. Applied Physics B, 69, 327-332.

Washburn et al. (2004). Infrared frequency comb for frequency metrology based on a tunable repetition rate fiber laser. In Technical Digest: Symposium on Optical Fiber Measurements, 2004. (pp. 11-14). IEEE.

Xin et al. (2018). Ultra-precise timing and synchronization for large-scale scientific instruments. Optica, 5(12), 1564-1578.

Xu et al. (2018). Three-octave terahertz pulses from optical rectification of 20 fs, 1 μm, 78 MHz pulses in GaP. Journal of Physics B: Atomic, Molecular and Optical Physics, 51(15), 154002:1-5.

Zhang et al. (2019). Intra-pulse difference-frequency generation of mid-infrared (2.7-20 μm) by random quasi-phase-matching. Optics letters, 44(12), 2986-2989.

Znakovskaya et al. (2014). Dual frequency comb spectroscopy with a single laser. Optics letters, 39(19), 5471-5474.

International Search Report from corresponding PCT/EP2020/087657 mailed Sep. 9, 2021.

* cited by examiner

A

B

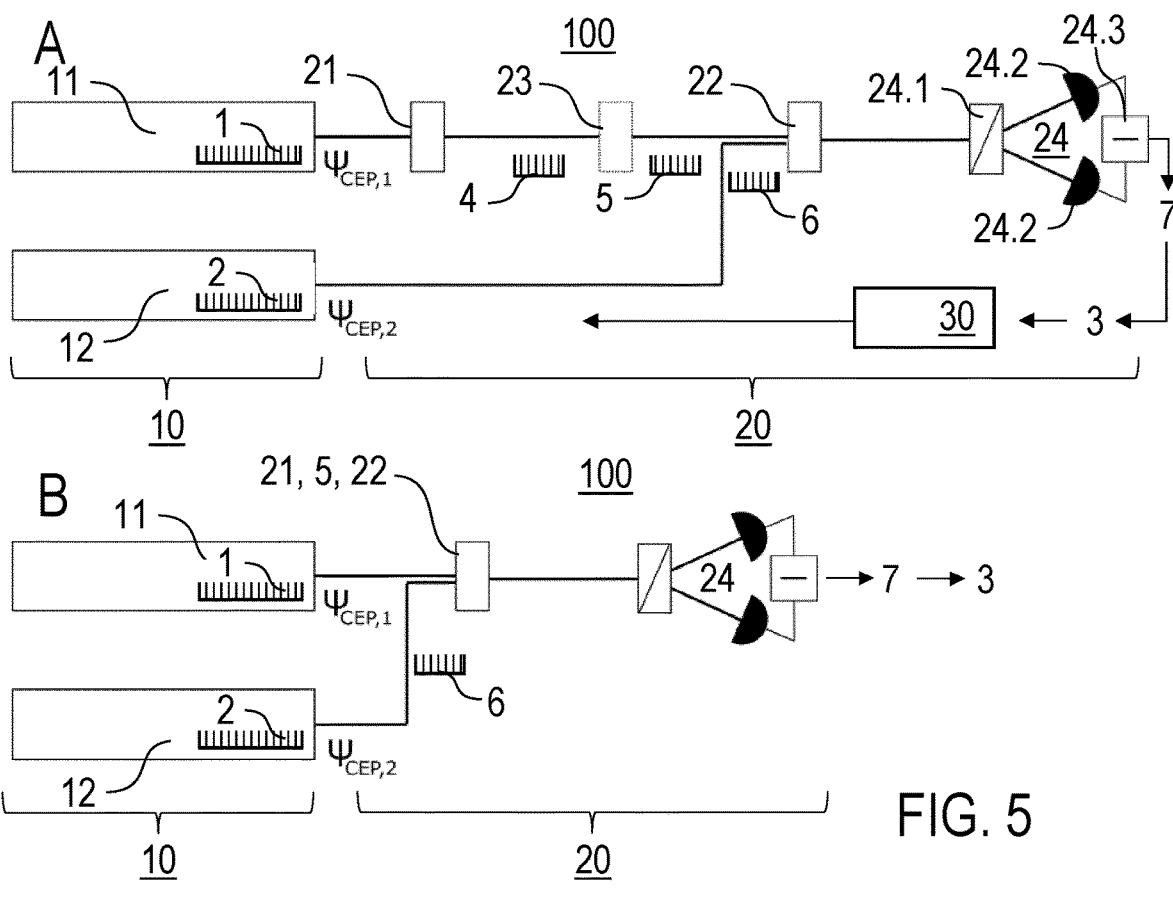
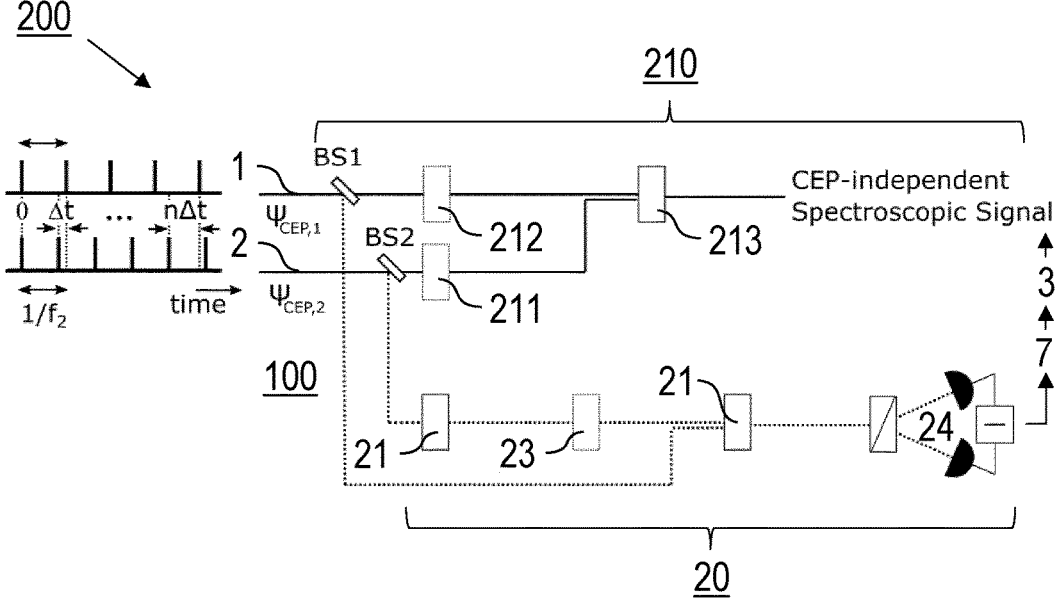
FIG. 5
FIG. 6

1

METHOD AND APPARATUS FOR MEASURING A TIME DELAY BETWEEN PAIRS OF PULSES FROM LASER PULSE SEQUENCES, AND APPLICATIONS THEREOF

CROSS-REFERENCE TO RELATED APPLICATIONS

This application is a U.S. National Phase Application of PCT/EP2020/087657, filed Dec. 22, 2020, the contents of which are incorporated herein by reference in their entireties for all purposes.

FIELD OF THE INVENTION

The invention relates to a laser pulse sequence measuring method for measuring a time delay (timing jitter) between the two laser pulse sequences (pulse trains). Furthermore, the invention relates to a spectroscopic measuring method including a time domain spectroscopic measurement, wherein the laser pulse sequence measuring method is employed. Furthermore, the invention relates to a laser pulse sequence measuring apparatus for measuring a delay between laser pulse sequences and to a spectroscopic measuring apparatus for a time domain spectroscopic measurement. Applications of the invention are available, e.g., in the fields of generating a precise delay axis in an asynchronous optical sampling or electronically controlled optical sampling experiment with two frequency-detuned lasers or the precise frequency-lock of two lasers (or frequency combs), in particular independent of additional measures for CEP stabilization.

TECHNICAL BACKGROUND

In the present specification, reference is made to the following prior art illustrating technical background of the invention and related techniques:

[1] I. Coddington, N. Newbury, W. Swann, Optica 2016, 3, 414;

[2] M. Kolano, O. Boidol, D. Molter, G. von Freymann, Opt. Expr. 2018, 26, 30338;

[3] J. Fellinger, A. S. Mayer, G. Winler, W. Grosinger, G. W. Truong, S. Droste, C. Li, C. M. Heyl, I. Hartl, O. H. Heckl, Opt. Expr. 2019, 27, 38062;

[4] S. M. Link, D. J. H. C. Maas, D. Waldburger, U. Keller, Science 2017, 356, 1164;

[5] K. Fritsch, J. Brons, M. Iandulskii, K. F. Mak, Z. Chen, F. Krausz, N. Picqué, and O. Pronin, "High-power dual-comb thin-disk oscillator," in 2019 Conference on Lasers and ElectroOptics Europe and European Quantum Electronics Conference, OSA Technical Digest (Optical Society of America, 2019), paper ca_5_2;

[6] T. Hochrein, R. Wilk, M. Mei, R. Holzwarth, N. Krumbholz, M. Koch, Opt. Expr. 2010, 18, 1614;

[7] I. Znakovskaya, E. Fill, N. Forget, P. Tournois, M. Seidel, O. Pronin, F. Krausz, A. Apolonski, Opt. Lett. 2014, 39, 5471;

[8] O. Schubert, M. Eisele, V. Crosatier, N. Forget, D. Kaplan, R. Huber, Opt. Lett 2013, 38, 2907;

[9] P. A. Elzinga, R. J. Kneisler, F. E. Lytle, Y. Jiang, G. B. King, N. M. Laurendeau, Appl. Opt. 1987, 26, 4303;

[10] A. Bartels, R. Cerna, C. Kistner, A. Thoma, F. Hudert, C. Janke, T. Dekorsy, Rev. Sci. Instr. 2007, 78, 035107;

[11] S. Kray, F. Speller, T. Hellerer, H. Kurz, Opt. Expr. 2010, 18, 9976;

2

[12] Y. Kim, D. S. Yee, Opt. Lett. 2010, 35, 3715;

[13] O. Kliebisch, D. C. Heinecke, T. Dekorsky, Opt. Expr. 2016, 24, 29930;

[14] R. J. B. Diez, N. Vieweg, T. Puppe, A. Zach, B. Globisch, T. Gobel, P. Leisching, M. Schell, Opt. Lett. 2014, 39, 6482;

[15] I. Pupeza, M. Huber, M. Trubetskov, W. Schweinberger, X. A. Hussain, C. Hufer, K. Fritsch, M. Poetzlberger, L. Vamos, E. Fill, T. Amotchkina, K. Kepesidis, A. Apolonski, N. Karpowicz, V. Pervak, O. Pronin, F. Fleischmann, A. Azzeer, M. Zigman, F. Krausz, Nature 2020, 577, 52;

[16] J. D. Deschênes, P. Giaccari, J. Genest, Opt. Expr. 2010, 18, 23358;

[17] Z. Chen, M. Yan, T. W. Hänsch, N. Picqué, Nature Comm. 2018, 9, 3035;

[18] Z. Chen T. Hänsch, N. Picqué, Proc. Nat. Ac. Sci. 2019, 116, 3454;

[19] D. J. Jones, S. A. Diddams, J. K. Ranka, A. Stentz, R. S. Windeler, J. L. Hall, S. T. Cundiff, Science 2000, 288, 635;

[20] A. Apolonski, A. Poppe, G. Tempea, Ch. Spielmann, Th. Udem, R. Holzwarth, T. W. Hänsch, F. Krausz, Phys. Rev. Lett. 2000, 85, 740;

[21] H. R. Telle, G. Steinmeyer, A. E. Dunlop, J. Stenger, D. H. Sutter, U. Keller, Appl Phys B 1999, 69, 327;

[22] J. Reichert, R. Holzwarth, Th. Udem, T. W. Hänsch, Opt. Comm. 1999, 172, 59;

[23] R. Liao, H. Tian, T. Feng, Y. Song, M. Hu, G. Steinmeyer, Opt. Lett. 2019, 44, 1060;

[24] T. Rybka, M. Ludwig, M. F. Schmalz, V. Knittel, D. Brida, A. Leitenstorfer, Nature Photon. 2016, 10 667;

[25] A. S. Kowligy, H. Timmers, A. J. Lind, U. Elu, F. C. Cruz, P. G. Schunemann, J. Biegert, S. A. Diddams, Science Adv. 2019, 5, eaaw8794;

[26] D. Hou, C. C. Lee, Z. Yang, and T. R. Schibli, Opt. Lett. 2015, 40, 2985;

[27] M. Lessing, H. S. Margolis, C. Tom, A. Brown, P. Gill, G. Marra, Opt. Expr. 2013, 21, 27057;

[28] M. Y. Peng, A. Klaydzyan, F. X. Kärtner, Opt. Expr. 2014, 22, 27102;

[29] J. Kim, Y. Song, Adv. Opt. Photon. 2016, 8, 465;

[30] M. Xin, K. Safak, F. X. Kärtner, Optica 2018, 5, 1564;

[31] T. Miura, H. Nagaoka, K. Takasago, K. Kobayashi, A. Endo, K. Torizuka, M. Washio, F. Kannari, Appl. Phys. B 2002, 75, 19;

[32] T. R. Schibli, J. Kim, O. Kuzucu, J. T. Gopinath, S. N. Tandon, G. S. Petrich, L. A. Kolodziejski, J. G. Fumimoto, E. P. Ippen, f. X. Kaertner, Opt. Lett. 2003, 28, 947;

[33] A. Schwarz, M. Ueffing, Y. Deng, X. Gu, H. Fattahi, T. Metzger, M. Ossiander, F. Krausz, R. Kienberger, Opt. Expr. 2012, 20, 5557;

[34] A. J. Benedick, J. G. Fujimoto, F. X. Kaertner, Nature Photon. 2012, 6, 97;

[35] R. W. Boyd, Nonlinear Optics 2008, $3^{rd}$ ed., Academic Press, Burlington, MA;

[36] A. Baltuska, T. Fuji, T. Kobayashi, Phys. Rev. Lett. 2002, 88, 133901;

[37] I. Pupeza, D. Sánchez, J. Zhan, N. Lilienfein, M. Seidel, N. Karpowicz, T. Paasch-Colberg, I. Znakovskaya, M. Pescher, W. Schweinberger, V. Pervak, E. Fill, O. Pronin, Z. Wei, F. Krausz, A. Apolonski, J. Biegert, Nature Phot. 2015, 179, 721;

[38] G. Gallot, D. Grischkowsky, J. Opt. Soc. Am. B 1999, 16, 1204;

[39] W. Schweinberger, L. Vamos, J. Xu, S. Hussain, C. Baune, S. Rode, I. Pupeza, Opt. Expr. 2019, 27, 4789;

[40] S. A. Hussain, C. Hofer, M. Hogner, T. Buberl, W. Schweinberger, D. Gerz, M. Huber, N. Karpowicz, f. Krausz, I. Pupeza, "Broadband mid-infrared waveform measurements with sub-attoseond sensitivity and reproducibility" (not published on the priority date of the present specification);

[41] C-Gaida, M. Bebhardt, T. Heuermann, F. Stutzki, C Jauregui, J. Antonio-Lopez, A. Schülzgen, R. Amezcua-Correa, A. Tunnermann, I. Pupeza, J. Limpert, Light: Sc. & Appl. 2018, 7, 94;

[42] J. Zhang, K. Fritsch, Q. Wang, F. Krausz, K. F. Mak, O. Pronin, Opt. Lett. 2019, 44, 2986;

[43] J. A. Fülüp, L. Pálfalvi, S. Klingebiel, G. Almàsi, F. Krausz, S. Karsch, J. Hebling, Opt. Lett. 2012, 37, 557;

[44] J. Xu, B. Globisch, C. Hofer, N. Lilienfein, T. Butler, N. Karpowicz, I. Pupeza, J. Phys. B 2018, 51, 154002;

[45] M. Nagai, K. Tanaka, H. Ohtake, T. Bessho, T. Sugiura, T. Hirosumi, M. Yoshida, Appl. Phys. Lett. 2004, 85, 3974; and

[46] B. Süß, F. Ringleb, J. Heberle, Rev. Sci. Instr. 2016, 87, 063113.

Mode-locked lasers have evolved over the last decades as major tools in different types of spectroscopies exploiting their short laser pulse duration, the possibility to convert light frequencies by nonlinear processes, broad spectral bandwidth and the spectral discretization in frequency combs. Many experiments involve two pulse sequences with a fixed or known pulse-to-pulse delay, which may also be varied, while reading out resulting signals in the time or the frequency domains. In recent years, several approaches have evolved, to use a combination of two (or more) frequency-synchronized mode-locked lasers for such spectroscopies, each providing an individually tailorable pulse sequence, but both with predefined mutual delay relationships between the laser pulses [1]. Other techniques have been developed to generate such pulse sequences with a single laser, for example by directly emitting two pulse sequences from a single cavity [2-5], by using the optically delayed response to a fast modulation of the cavity [6], or by using acousto-optic diffraction of the laser output [7, 8].

The term "delay between two pulses" as used in the present specification refers to the temporal separation between the centers of mass of the two laser pulses. In the specific case of the pulse repetition frequencies $f_1$ and $f_2$ in the two pulse sequences being identical, $f_1 = f_2$, both pulse sequences are exactly in synchrony, with a fixed delay between the corresponding pulses. In the alternative case, if the two pulse repetition frequencies differ by a small detuning $\Delta f = f_2 - f_1$, the delay between two corresponding pulses advances from one pulse pair to the next. In this case, the two pulse sequences intrinsically perform a recurring delay scan that is periodic with the frequency detuning $\Delta f$ of the two pulse sequences. This delay scan with a fixed delay is called asynchronous optical scanning (ASOPS) [9, 10]. The delay step size is given by $$\Delta t = \frac{1}{f_1} - \frac{1}{f_2} = \frac{\Delta f}{f_1 f_2} \approx \Delta f / f_1^2.$$

Actively modulating the frequency difference between the two lasers allows for additional degrees of freedom to reduce the delay range and increase the scan speed. This delay scan with a modulated delay is called electronically controlled optical sampling (ECOPS) [11,12].

FIG. 2 compares the above two applications for dual-oscillator based delay scans, in which the two pulse sequences are derived from two separate laser oscillators with a controlled frequency detuning $\Delta f$. ASOPS uses a constant frequency detuning $\Delta f_{const}$ (FIG. 2A, left panel) to achieve a linear delay scan (FIG. 2A, right panel), where $\tau = n \Delta t_{const}$ is the current delay after n pulse pairs with a constant delay step size $\Delta t_{const}$. The maximum delay is equal to the repetition period of laser 1, $\tau_{max} = 1/f_1$, thus also limiting the achievable scan rate at a given delay step size $\Delta t$. ECOPS periodically modulates the frequency detuning $\Delta f$ between $\Delta f_{max}$ and $\Delta f_{min} = -\Delta f_{max}$, as shown in FIG. 2B, left panel, for example by vibrating an end mirror of one oscillator with a piezo actuator. The delay T follows the modulation of the frequency detuning, as shown in FIG. 2B, right panel, so that the scan rate is given by the frequency of the applied modulation and can easily reach the multi-kHz regime. The maximum delay $\tau_{max}$ (given by the cumulative sum of the varying delay steps per half-period of the oscillation) can be orders of magnitude smaller than for ASOPS. The periodic delay reversal limits the maximum delay $\tau_{max}$. ECOPS allows to mutually adapt delay step size, frequency resolution and scan rate to the spectroscopic requirements.

For any delay scan method using two detuned pulse sequences, the repetition frequency detuning must be precisely controlled and/or known over the duration of the measurement time, because any variation in $\Delta f$ directly translates into a jitter of the inter-pulse delays. Due to the periodic nature of delay advancement, any errors in $\Delta f$ cumulatively increase the timing error during a scan [10].

As a consequence, in the spatial domain, optical path length differences of meter-sized laser roundtrips need to be known or controlled in such experiments with nanometer precision. Strategies have been developed to overcome mutual jitter by emitting two pulse sequences with a single laser [2-5], but timing jitter is commonly still in the 0.1 femtosecond regime and higher. While approaches like ECOPS provide additional degrees of freedom in terms of delay range and scan rate, the electronically controlled laser mirror vibrations also induce additional mechanical and electronic noise and increase the timing jitter, so that the timing precision for this type of spectroscopy is typically still in the multi-femtosecond regime [2, 12, 13, 14]. On the other hand, many time-resolved techniques like optical-field-resolved spectroscopy require knowledge of the delay axis with few attosecond precision or better [15].

Frequency-comb based approaches to measure the timing between pulse sequences linearly interfere lines of the frequency combs of the two pulse sequences with each other and deduce the repetition frequency detuning from the beat oscillation. The signal-to-noise ratio (SNR) can be increased by using intermediate narrowband continuous wave lasers [16]. The resulting beating pattern, however, depends not only on the delay of the two pulse sequences, but also on the mutual difference of the CEPS of the two pulse sequences. Therefore, an extraction of the pulse-to-pulse delays requires the additional knowledge of the CEP relationship between the two pulse sequences. Elaborate schemes for CEP stabilization have been developed [17], and have recently been transferred to the mid-infrared range [18]. Typical CEP measurements involve spectral broadening of the laser pulses to more than one octave in a nonlinear fiber and second harmonic generation of the red components to generate an f-to-2f interferometric signal [19-22]. The cascaded nonlinear processes in this chain constitute the main bottleneck for CEP detection sensitivity [23], and ultimately also limit the precision for inter-pulse delay measurements and frequency locking in this scheme. The lowest rms values reported to date for CEP jitter are around 15-20 mrad [23, 24]. In an ASOPS-type mid-infrared spectroscopic experiment a residual timing jitter of 83 as has recently been reported for comb-based locking [25], corresponding to a phase jitter of ca. 100 mrad.

A technique to measure the delays between the pulses of two lasers that does not intrinsically require an additional CEP measurement not only reduces complexity, but also allows to reach timing precision that is not limited by the CEP detection sensitivity and control bandwidth. Approaches exist to circumvent standard CEP measurements, by using multiple comb line pairs, but still have additional requirements on the spectral overlaps of the two comb spectra [26]. Furthermore, ECOPS-type delay scan approaches intrinsically involve a dynamic frequency relationship between the two pulse sequences, which is usually not compatible with stabilization methods involving comb line interference. Thus ECOPS-type systems typically have to rely on electronic frequency locking [11, 12].

Electronic approaches can determine the momentary frequency difference of the two pulse sequences without knowledge of the CEP relationship. Such methods convert the optical pulse sequences into synchronized microwave electric signals and directly compare them electronically. Pure electronic synchronization remains affected by electronic noise and detector saturation effects, limiting the precision for timing jitter measurements by amplitude-to-phase noise conversion. Meanwhile, optical to microwave synchronization with a long-term stability below 1 fs can be achieved using Sagnac interferometric signal generation [27, 28]. Nonetheless, synchronizing two mode-locked lasers with sub-femtosecond precision typically requires additional optical timing measurements [29]. Timing precision for ECOPS-type experiments remains in the multi-femtosecond regime [2, 12, 13, 14]. The absolute precision of timing measurements for a given SNR is limited by the frequency of the investigated reference signal.

Electronic timing jitter measurement and locking can be improved by inspecting high harmonics of the laser repetition frequencies with typical upper limits in the GHz regime. In comparison, optical signals like the ones used in this invention can access signal frequencies that approach the Nyquist limit of pulse-to-pulse detection, providing much higher timing precision at given SNR levels. Conversely, the same timing precision can be obtained with optical methods in a much shorter acquisition time, making the presented method suitable for measuring the delays also on the sub-optical-cycle level.

Nonlinear optical detection of the timing between two pulse sequences has the potential advantage of reaching large signal changes within few consecutive pulses, typically linked to the temporal width of the pulse intensity envelopes in relation to the delay step size. Such approaches are also robust against drifts and jitter arising from electronic noise and avoid the amplitude-to-phase noise conversion experienced in pure electronic detection [30]. The nonlinear sum frequency cross-correlation signal between the pulses from two mode-locked lasers has been used in the past to lock their repetition frequencies [31]. The measured $2^{nd}$-order intensity cross correlation is independent of the difference in CEP slippage between the pulse sequences and has a maximum for precise temporal intensity overlap of all pulses of the two pulse sequences. The SNR can be improved by removing background through balanced detection [32], and by spatially mapping the delay axis onto a position-sensitive detector [33]. Laser synchronization down to the 10 as regime (100 Hz—Nyquist-limit band) has been demonstrated with balanced optical cross correlation [34]. The approach has two major drawbacks: (i) The delay-dependence of the signal follows the cross correlation of the intensity envelopes of the laser pulses, thereby directly linking the achievable precision to the pulse durations of the two lasers. (ii) The technique produces a signal only during the temporal overlap of the pulses from both pulse sequences, and can thus not track a delay sweep occurring with detuned laser repetition frequencies.

OBJECTIVE OF THE INVENTION

It is an objective of the invention to provide an improved laser pulse sequence measuring method for measuring a relative delay between two laser pulse sequences, being capable of avoiding disadvantages of conventional techniques. In particular, the laser pulse sequence measuring method is to be capable of measuring the delay (timing) between the two laser pulse sequences, e.g., emitted from mode-locked oscillators, with increased precision, extended applications, e.g., in spectroscopy, and/or reduced complexity, e.g., without requiring a measurement, stabilization or knowledge of a CEP slip between the two laser pulse sequences and/or without requiring a spectral overlap or a predefined spectral relationship between the two laser pulse sequences. It is a further objective of the invention to provide an improved spectroscopic measuring method including a time domain spectroscopic measurement, being capable of avoiding disadvantages of conventional techniques. In particular, the time domain spectroscopic measurement is to be executed with a delay axis using a pulse-to-pulse delay advancement of two frequency-detuned laser pulse sequences, wherein the delay axis is provided with increased precision and reduced complexity. Further objectives of the invention are to provide an improved laser pulse sequence measuring apparatus for measuring a delay between two laser pulse sequences and/or an improved spectroscopic measuring apparatus for a time domain spectroscopic measurement, avoiding disadvantages of conventional techniques and in particular being capable of measuring the delay with increased precision and/or reduced complexity.

SUMMARY OF THE INVENTION

The above objectives are solved by a laser pulse sequence measuring method, a spectroscopic measuring method, a laser pulse sequence measuring apparatus and a spectroscopic measuring apparatus of the invention.

According to a first general aspect of the invention, the above objective is solved by a laser pulse sequence measuring method for measuring two laser pulse sequences, in particular with one of them having a constant carrier envelope phase, including measuring a delay between a pair of pulses from the two laser pulse sequences, i. e. a delay between two pulses each from one of the two laser pulse sequences. The laser pulse sequence measuring method comprises the steps of creating a first laser pulse sequence of first laser pulses and a second laser pulse sequence of second laser pulses and generating a delay signal which represents the delay between the pair of pulses from the first and second laser pulse sequences. In particular, the amplitude of the delay signal is a quantitative measure of the delay between the first and second laser pulse sequences.

According to the invention, the step of generating the delay signal includes creating intra-pulse difference frequency generation (IPDFG) pulses by applying an intra-pulse difference frequency generation to the first laser pulses in a difference frequency generation (DFG) medium, providing phase-stable reference waveforms based on the IPDFG pulses, and electro-optic sampling (EOS) an electric field of the phase-stable reference waveforms with sampling pulses in an EOS medium, wherein the sampling pulses are created based on the second laser pulses, for generating an electro-optic sampling (EOS) signal, wherein the delay signal is obtained from the EOS signal.

According to a second general aspect of the invention, the above objective is solved by a spectroscopic measuring method including a time domain spectroscopic measurement, wherein the method of generating two laser pulse sequences according to the first general aspect of the invention or an embodiment thereof is executed, and the first and second laser pulse sequences are used for the time domain spectroscopic measurement. In particular, part of the original laser pulses or both pulse sequences are used to perform the time-domain spectroscopic measurement, and the EOS signal between both pulse sequences is used for a calibration measurement to reconstruct a delay axis of the time-domain spectroscopic measurement. The time domain spectroscopic measurement preferably comprises irradiating a sample to be investigated with measuring pulses, e.g., THz or mid-infrared pulses, provided by one of the first and second laser pulse sequences, and sampling the measuring pulses after an interaction with the sample. The sampling is done with the other one of the first and second laser pulse sequences with a varying delay relative to the measuring pulses. The varying delay can be set and/or monitored using the delay signal.

According to a third general aspect of the invention, the above objective is solved by a laser source apparatus being configured for creating two laser pulse sequences and measuring a delay between a pair of pulses from two laser pulse sequences, comprising at least one pulse laser source device being arranged for creating a first laser pulse sequence of first laser pulses and a second laser pulse sequence of second laser pulses, and a delay signal generation device being arranged for generating a delay signal which represents the delay between the pair of pulses from the first and second laser pulse sequences.

According to the invention, the delay signal generation device includes a difference frequency generation (DFG) medium and an electro-optic sampling (EOS) medium, wherein the DFG medium is arranged for creating intra-pulse difference frequency generation (IPDFG) pulses by applying an intra-pulse difference frequency generation to the first laser pulses, the delay signal generation device is further configured for providing phase-stable reference waveforms based on the IPDFG pulses, and the EOS medium is arranged for electro-optic sampling the field of the phase-stable reference waveforms with sampling pulses being derived from the second laser pulses, for generating an electro-optic sampling (EOS) signal, wherein the delay signal is obtained from the EOS signal. Preferably, the laser source apparatus or an embodiment thereof is configured for executing the method of generating two laser pulse sequences according to the first general aspect of the invention or an embodiment thereof.

According to a fourth general aspect of the invention, the above objective is solved by a spectroscopic measuring apparatus being configured for a time-domain spectroscopic measurement, including the laser source apparatus according to the third general aspect of the invention or an embodiment thereof, being arranged for creating the first and second laser pulse sequences, and a time domain spectroscopic measurement set-up being adapted for using the first and second laser pulse sequences for the time domain spectroscopic measurement.

Advantageously, the present invention provides a method for measuring (determining, in particular tracking) the optical delay (or: timing jitter) between corresponding pulses of two laser pulse sequences, which may have a detuning in repetition frequency and which are emitted by at least one pulse laser source device, in particular either emitted by two separate mode-locked laser oscillators, or derived by beam splitting and manipulating means (for example acousto-optic modulation or mechanical delay scanning) from one single mode-locked oscillator. The optical delay is determined by monitoring the electric light field derived from the nonlinear IPDFG pulses of one of the laser pulse sequences using electro-optic sampling with the other one of the laser pulse sequences. This is advantageously achieved without requiring measurement or control of the carrier-envelope phases (CEPs) of neither of the two pulse sequences.

As a further advantage, the invention does not require the two laser pulse sequences to have a common spectral overlap or predefined spectral relationship. Furthermore, with sufficiently fast detection electronics, the method is capable of measuring the inter-pulse timing for each individual pair of pulses. The measured delay signal can be used, e.g., for a delay calibration, as an error signal to lock the two pulse sequences in repetition frequency and/or for active synchronization of two laser pulse sequences to the same repetition frequency or to two repetition frequencies with a fixed mutual relationship. In particular, the obtained delay signal can be used to construct the delay axis (reference time signal) for time domain experiments using the pulse-to-pulse delay advancement of two frequency-detuned pulse sequences.

As a further substantial advantage, the precision of measuring the delay signal is only limited by the frequency of the IPDFG pulses and the signal/noise ratio. Thus, the invention supports attosecond, or even sub-attosecond timing precision.

Intra-pulse difference frequency generation applied to the laser pulses of one of the laser pulse sequences (indicated as the first laser pulse sequence) in the DFG medium, like an optically nonlinear crystal, results in the IPDFG pulses. Both of the IPDFG pulses and phase-stable reference waveforms comprise pulses of light fields, i. e. pulse-shaped waveforms of electric fields in time domain and a series of frequency components in frequency domain. The IPDFG pulses have frequency components equal to intra-pulse frequency differences of the frequency components within the laser pulses of the first laser pulse sequence. According to preferred embodiments of the invention, the phase-stable reference waveforms are infrared, in particular mid-infrared, pulses. According to alternative embodiments of the invention, the phase-stable reference waveforms are THz pulses or near-infrared/visible pulse. Near-infrared pulses have advantages in terms of improved timing, and mid-IR pulses are preferred as the currently most suitable choice in terms of pulse duration requirements and maximum timing jitter within the Nyquist limit.

The phase-stable reference waveforms to be sampled with the laser pulses of the second laser pulse sequence are derived from the IPDFG pulses. Advantageously, various options exist for providing the phase-stable reference waveforms.

According to a preferred embodiment of the invention, the phase-stable reference waveforms are created by a bandwidth reduction of the IPDFG pulses. To this end, preferably the delay signal generation device is configured for creating the phase-stable reference waveforms by the bandwidth reduction of the IPDFG pulses. The bandwidth reduction of the IPDFG pulses advantageously allows that the electric field of the phase-stable reference waveforms covers a full delay range (range of possible pulse delays) of interest and the EOS signal has an improved SNR through-out the delay range to extract the timing information.

Advantageously, various techniques of spectral band-width reduction are available. According to a first preferred variant, the bandwidth reduction is created with the intra-pulse difference frequency generation, in particular by at least one of shaping the first laser pulses, setting phase matching conditions in the DFG medium and shaping the DFG medium. Bandwidth reduction during the IPDFG process, in particular the above examples of spectral band-width reduction, have advantages as they can be simply implemented in combination with the IPDFG process. Alter-natively, or additionally, with further variants, the bandwidth reduction is created after the intra-pulse difference fre-quency generation by filtering the IPDFG pulses. In this case, the delay signal generation device preferably includes a spectral filter arranged downstream of the DFG medium.

According to another preferred embodiment of the inven-tion, the phase-stable reference waveforms are created by applying a time chirp to the IPDFG pulses. Accordingly, the delay signal generation device can be configured for creating the phase-stable reference waveforms by applying the time chirp to the IPDFG pulses, e.g., by a chirping optical component, like a chirping mirror. Advantageously, apply-ing the time chirp to the IPDFG pulses allows stretching IPDFG pulses to span the full delay range of interest.

According to yet a further preferred embodiment of the invention, the phase-stable reference waveforms are pro-vided by a coherent sample resonance response being cre-ated via irradiating a resonant sample with the IPDFG pulses. Preferably, the delay signal generation device is configured for providing the phase-stable reference wave-forms by the coherent sample resonance response. Advan-tageously, by exciting a long-lived atomic, molecular or other resonance in a sample, the excitation generates a well-defined resonance oscillation of the light electric field in the wake of the excitation pulse, whose emission is π-phase-shifted with respect to the excitation light field. While the transient sample response is not accessible in standard intensity absorption spectroscopy, electro-optic sampling is sensitive to the electric light field itself and observes the resonance-induced ringing in the wake of the excitation pulse (see [15]). The type of resonance depends on the wavelength of the IPDFG signal and the delay range. For picosecond delay ranges, narrow absorption resonances in the condensed phase can for example provide such signal, whereas nanosecond delay ranges can for example be cov-ered by long-lived resonance oscillations in gas samples.

According to another embodiment of the invention, the phase-stable reference waveforms can be provided by the IPDFG pulses as such, i.e. each IPDFG pulse directly is one phase-stable reference waveform. With this preferred embodiment, EOS may comprise sampling the electric field of the IPDFG pulses as output from the DFG medium. Advantageously, this reduces the complexity of the optical set-up.

If, according to a further preferred embodiment of the invention, the delay signal is obtained from zero-crossing sections of the EOS signal, the dependency of the EOS signal from the repetition frequency difference between the first and second laser pulse sequences is simplified in an advantageous manner to a linear function, thus facilitating applications of the delay signal.

Particularly preferred, for the first and second laser pulse sequences having a periodic delay axis, with the period for a delay recurrence rate being an integer multiple n of the pulse-to-pulse delay, the delay signal is obtained as a down-sampled delay signal by sampling the EOS signal at the zero-crossing sections thereof with the delay recurrence rate.

The sampling pulses are created based on the second laser pulses, wherein the sampling pulses can be designed for an adaptation to the temporal shape of the phase-stable refer-ence waveforms. Preferably, the sampling pulses are pro-vided directly by the second laser pulses. Alternatively, the sampling pulses are provided by compressing the second laser pulses. The delay signal generation device is config-ured for providing the sampling pulses directly by the second laser pulses or by compressing the second laser pulses, e.g., with a pulse compressor. Temporal compression has advantages for improving the SNR of electro-optic sampling.

Further design options are available with regard to the optically non-linear media used for creating the delay signal. According to a first variant, the DFG medium and the EOS medium comprise two optically non-linear crystals. Advan-tageously, this embodiment facilitates the optimization of each of the crystal media for IPDFG or EOS. According to a second, alternative variant, one single optically non-linear crystal is used for providing both of the DFG medium and the EOS medium. Accordingly, the complexity of the optical set-up is reduced in an advantageous manner.

According to another preferred embodiment of the inven-tion, the delay signal is used for feedback-controlling a repetition frequency of at least one of the first and second laser pulse sequences. The delay signal provides an actual value representing the delay between the first and second laser pulse sequences. The actual value is compared with a predetermined delay target value for creating a control signal controlling at least one pulse laser source device. The delay signal generation device provides a feedback loop, and it is adapted for creating the control signal supplied to the at least one pulse laser source device. As an example, the repetition frequency of the controlled pulse laser source device can be adjusted by setting the position of an end mirror of one oscillator, e.g., with a piezo actuator. Control-ling the repetition frequency on the basis of the delay signal has particular advantages in terms of a simple and reliable configuration of the feedback loop.

Particularly preferred, the delay signal is used for feed-back-controlling the repetition frequency of at least one of the first and second laser pulse sequences so that they have equal repetition frequencies. Accordingly, the repetition frequency of at least one of the first and second laser pulse sequences is controlled such that the delay signal is zero (delay target value=0). Alternatively, the delay signal is used for feedback-controlling the repetition frequency of at least one of the first and second laser pulse sequences so that they have detuned repetition frequencies with a detuning $\Delta f$ (delay target value >0).

With a further preferred embodiment, applied for the first and second laser pulse sequences having a periodic delay axis, with the period for a delay recurrence rate being an integer multiple n of the pulse-to-pulse delay (e.g., ASOPS or ECOPS), the delay signal is obtained by sampling the EOS signal at the zero-crossing sections thereof with the delay recurrence rate and the delay signal is used for PID feedback-controlling the repetition frequency of at least one of the first and second laser pulse sequences. Advantageously, the delay signal is the downsampled signal, and feedback-controlling of the laser pulse sequences is obtained by n-times downsampling of the EOS signal, where n is the number of pulses per delay cycle.

According to a preferred embodiment of the spectroscopic measuring method, the delay signal is used for creating a delay axis for the time domain spectroscopic measurement. Creating the delay axis of the time domain spectroscopic measurement comprises creating the measuring pulses with one of the two laser pulse sequences and sampling pulses with the other one of the two laser pulse sequences, wherein the laser pulse sequences are created with a pulse-to-pulse delay advancement following a predetermined variation, which can be derived from or monitored with the delay signal.

According to further preferred embodiments of the spectroscopic measuring method, the second laser pulse sequence is subjected to a delay modulation of the delay relative to the first laser pulse sequence and/or to a repetition frequency modulation relative to the first laser pulse sequence. The pulse laser source devices preferably are provided with a fast modulator being configured for introducing the delay and/or repetition frequency modulation. Advantageously, the delay and/or repetition frequency modulation can be set by employing a modulated delay target value for feedback-controlling the repetition frequency of the one of the first and second laser pulse sequences.

If, according to a further preferred embodiment of the invention, the delay signal is used for postprocessing output data of the time domain spectroscopic measurement, advantages in terms of noise reduction of the output data can be obtained.

Features disclosed in the context of the laser pulse sequence measuring method and the embodiments thereof or the spectroscopic measuring method and the embodiments thereof also represent preferred features of the inventive laser source apparatus and spectroscopic measuring apparatus. The aforementioned aspects and inventive and preferred features, in particular with regard to the configuration of the laser pulse sequence measuring apparatus and the spectroscopic measuring apparatus as well as the dimensions and compositions of individual components being described in relation to the apparatuses, also apply for the methods. The preferred embodiments, variants and features of the invention described above are combinable with one another as desired.

BRIEF DESCRIPTION OF THE DRAWINGS

Further details and advantages of the invention are described in the following with reference to the attached drawings, which schematically show in:

FIG. 5: features of a laser pulse sequence measuring apparatus according to embodiments of the invention;

FIG. 6: an application of the invention for providing the delay axis in a time-domain spectroscopic setup based on two asynchronous laser pulse sequences;

PREFERRED EMBODIMENTS OF THE INVENTION

Figure 1:
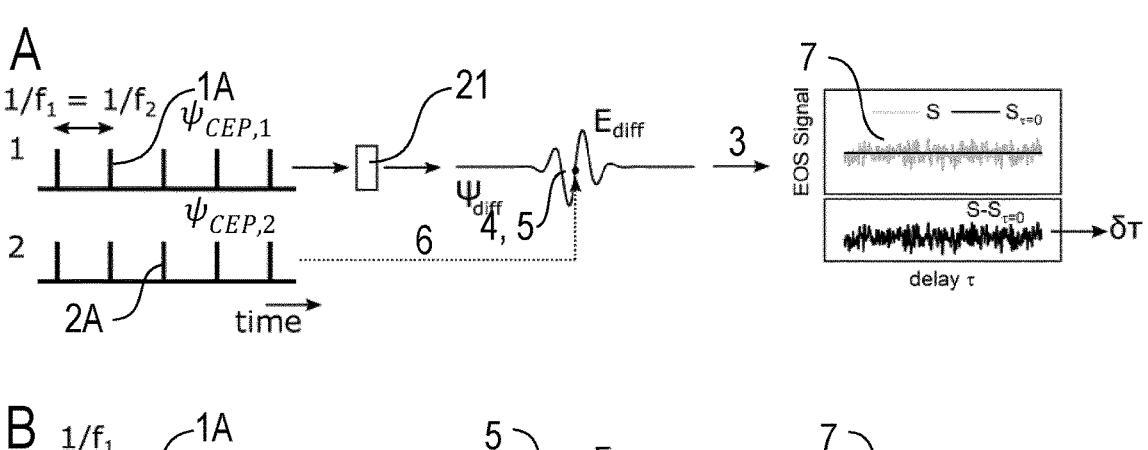
FIG. 1: an illustration of monitoring the delay between pulses from two different pulse sequences in accordance with embodiments of the present invention.
Figure 1:
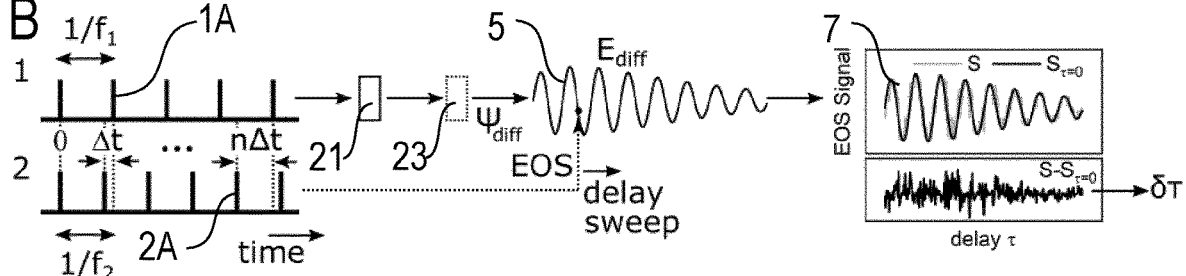

Embodiments of the invention are described in an exemplary manner with reference to a configuration with a disk laser source and a fiber laser source for creating the laser pulse sequences. It is emphasized that implementing the invention in practice is not restricted to these laser sources but correspondingly possible with other available types of laser sources. The delay signal is obtained with the inventive method by electro-optic sampling the waveform of the phase-stable reference waveforms. Electro-optic sampling is known per se, so that it is not described in detail. The drawings are schematic illustrations. Details of the optical set-up, like mirrors, lenses and/or beam diagnostics or sensors are known per se, so that they are not shown or described.

Measuring a Temporal Delay Between the Laser Pulse Sequences

Features of embodiments of a laser pulse sequence measuring method for generating two laser pulse sequences and measuring a delay between the two laser pulse sequences are described in the following with reference to FIGS. 1 to 4.

The present invention uses nonlinear intra-pulse difference frequency generation (IPDFG) driven by a first laser pulse sequence and uses the pulses from a second laser pulse sequence to generate an electro-optic sampling (EOS) signal of the IPDFG field that is sensitive to the delay between the pulses of both laser pulse sequences. The IPDFG field can be provided directly by the IPDFG pulses or by phase-stable reference waveforms derived from the IPDFG pulses, e.g., by spectral and/or temporal conditioning. Because the proposed method is independent in the CEP of the original pulses, the pulse sequences may be the outputs of two individual lasers or a single laser without any CEP stabilization (see FIG. 5).

According to FIG. 1A, a first laser pulse sequence 1 and a second laser pulse sequence 2 are locked together to equal repetition frequencies $f_1 = f_2$, and they comprise first laser pulses 1A and second laser pulses 2A in synchronization with an identical delay between each mutual pair of pulses (here set to zero for convenience). With IPDFG of the first laser pulses 1A, a difference electric field $E_{diff}$ is generated. The difference electric field $E_{diff}$ provides the IPDFG pulse 4, which represents the phase-stable reference waveform 5 to be sampled. The carrier envelope phase $\psi_{diff}$ of the field $E_{diff}$ does not depend on the carrier envelope phase (CEP) of the first laser pulse sequence 1, $\psi_{CEP,1}$. Electro-optic sampling of $E_{diff}$ preferably at a zero-crossing as described below, using the second laser pulse sequence 2 produces a delay signal 3 that varies proportional to the delay changes between corresponding pulses and is independent of both CEPs, $\psi_{CEP,1}$ and $\psi_{CEP,2}$ of the original pulse sequences 1, 2.

FIG. 1B illustrates a modified case, wherein the two laser pulse sequences 1, 2 are slightly detuned in repetition frequency by a frequency difference $\Delta f$, leading to a delay slip between both pulse sequences that continuously advances by $\Delta t$ from one pulse to the next. The invention can also be used if the detuning between both pulse sequences is modulated, as outlined below. As in FIG. 1A, IPDFG of the first laser pulse sequence 1 generates a phase-stable electric difference field $E_{diff}$ (IPDFG pulse). Optional conditioning (Con) like a filter or optical material for pulse chirping may be used to stretch $E_{diff}$ (phase-stable reference waveform 5), so that it spans the full delay range of the delay sweep induced by the advancing delay slip. Electro-optic sampling with the second laser pulse sequence 2 maps the electric difference field. For a known $E_{diff}$ the difference between the recorded EOS signal and the expected EOS signal 7 maps the delay between corresponding pulses.

With more details, IPDFG driven by the pulses of one laser pulse sequence (first laser pulse sequence 1 in FIGS. 1A and 1B) in an IPDFG medium 21 produces the phase-stable reference waveform 5 with an electric field $E_{diff}$. The phase-stable reference waveform 5 can be directly provided by the IPDFG process (FIG. 1A) or derived therefrom (FIG. 1B). The electric field $E_{diff}$ oscillates according to a polarization following the intensity envelope of the driving pulse [35]. Thus, the CEP $\psi_{diff}$ of the resulting electric field $E_{diff}$ is intrinsically independent of the CEP $\psi_{CEP,1}$ of the original pulse sequence [36]. Depending on the spectral bandwidth of the first laser pulses 1A and the phase matching conditions in the IPDFG medium 21, $E_{diff}$ oscillates for near-infrared driving pulses with carrier frequencies in the terahertz or mid-infrared spectral range. IPDFG also avoids phase jitter imprinted onto $\psi_{diff}$ by interferometric instabilities, as encountered in difference frequency generation with pulses from two separate beams [37].

According to the invention, the delay relationship between pulses of both laser pulse sequences 1, 2 is obtained by electro-optic sampling the phase-stable difference frequency electric field $E_{diff}$ from the first laser pulse sequence 1, using the laser pulses 2A of the second laser pulse sequence 2) as sampling pulses 6. EOS measures the birefringence introduced by an (optical) electric field in an EOS medium 22 (see FIG. 5), e.g., an optically nonlinear crystal, using the sampling pulse 6 in combination with polarization-sensitive detection [38]. It produces an EOS signal 7 that is directly proportional to the electric-field amplitude (including the sign) of the sampled waveform (in the present example $E_{diff}$) at the current inter-pulse delay position, convoluted with a predetermined temporal response function. The latter is determined in a known manner mainly by the phase matching conditions and pulse duration of the sampling pulse [15].

The process of EOS represents a nonlinear mixing step (e.g., sum-frequency generation) between the sampling pulses 6 and the pulses of the sampled waveform 5, followed by heterodyne detection of this field $E_{NL}$, using the residual sampling electric field ($E_{sampling}$) as a local oscillator [38]. The nonlinear mixing process imprints the CEP of the second laser pulse sequence 2 (sampling pulses 6) ($\psi_{CEP,2}$) onto $E_{NL}$. Because both $E_{sampling}$ and $E_{SF}$ experience the same dependence on the CEP of the second laser pulse sequence 2, linear interference between the two produces a signal that is itself independent of $\psi_{CEP,2}$. Hence, the measured EOS signal is independent of the CEPs $\psi_{CEP,1}$ and $\psi_{CEP,2}$ of both pulse sequences 1, 2. The IPDFG field 5 $E_{diff}$ oscillates with the momentary light frequency, thus translating any change in inter-pulse delay into a change in measured amplitude of the EOS signal. In this way, the EOS signal tracks changes in inter-pulse delay without requiring knowledge of the CEP relationship between the two pulse sequences 1, 2.

The EOS signal (EOS(t)), oscillating with the carrier frequency $f_{diff}$ can be typically described without loss of generality by $$EOS(t)=A(t)\times\sin(2\pi f_{diff}t+\varphi), \tag{1}$$

where $A(t)$ is the pulse envelope of the EOS signal, t is the time, and $\varphi$ is a phase term which comprises the CEP $\psi_{diff}$ and other predetermined phase contributions, which may generally also be time-dependent. In the vicinity of a zero-crossing of the EOS signal, equation (1) can be expressed by a Taylor expansion, wherein any small variation $\tau$ in the delay between the centers of mass of the IPDFG pulses 5 and sampling pulses 6 translates into a linear signal change $\Delta EOS_{zc}$ $$\Delta EOS_{zc}=A_{zc}2\pi f_{diff}\tau, \tag{2}$$

where $A_{zc}$ is the EOS oscillation amplitude at the zero-crossing.

The delay variation is calculated from the EOS signal change by $$\tau = \frac{\Delta EOS_{zc}}{A_{zc}2\pi\, f_{diff}}. \tag{3}$$

The smallest delay variation $\tau_{min}=\sigma_\tau$ that can be measured around a zero-crossing is given by $$\sigma_\tau = \frac{\Delta EOS_{zc}}{A_{zc}\,2\pi\,f_{diff}} = \frac{\sigma}{A_{zc}\,2\pi\,f_{diff}} = \frac{1}{S/N\,2\pi\,f_{diff}}, \tag{4}$$

where it is assumed that the smallest measurable signal change $\Delta EOS_{zc,min}$ is equal to the standard deviation $\sigma$ of the measurement noise, and $$\frac{S}{N} = \frac{A_{zc}}{\sigma}$$

is the SNR around the zero-crossing. Hence the precision for measuring the timing between both pulse sequences is only limited by the achievable SNR and the frequency of the EOS signal oscillations. In the ideal case of shot-noise limited detection, the SNR is given by the square root of the number of photons $n_{phot}$:

$$\sigma_{\tau,SNL} = \frac{1}{2\pi\, f_{diff}\,\sqrt{n_{phot}}}. \tag{5}$$

The signal $\Delta EOS_{zc}$ (delay signal 3) has the form of a biased error signal that can be directly used in an active stabilization loop to synchronize the two pulse sequences to the same repetition frequency (FIG. 1A).

In the case of a (potentially also time-varying) frequency detuning $\Delta f$ as in ASOPS or ECOPS the delay between corresponding pulses can be deduced from the oscillations of the EOS signal during the resulting delay sweep, if the expected EOS signal is known—for example by precisely measuring an EOS reference trace with an interferometrically referenced mechanical delay scan [15, 39]. Even in the case of amplitude noise from laser fluctuations the zero-crossings and maxima/minima of an oscillating EOS signal can provide a reliable delay grid. Intermediate delays can be deduced from the known signal shape. For small delay variations the delay change can generally be related for a known waveform to the signal slope $dS/d\tau$ and the signal change $\Delta S$ via $$\tau = \Delta S / \frac{dS}{d\tau}. \tag{6}$$

The highest temporal localization precision is given at the points of highest signal change—normally the zero-crossings, where equations (1) to (5) hold. More generally, the timing precision is related to the momentary slope of the EOS signal $dS/d\tau$ and the detection noise $\sigma$ via $$\sigma_\tau = \sigma / \frac{dS}{d\tau}. \tag{7}$$

Deduction of a delay axis from the known EOS signal does not require the EOS signal to strictly follow equation (1). The signal may also be frequency-chirped or otherwise distorted. The only features for mapping the delay are that (i) the sampling pulses 6 are sufficiently short to resolve the temporal changes of $E_{diff}$;

(ii) the Nyquist condition is fulfilled, i.e. the delay variation from one pulse pair to the next is smaller than or equal to half the period of the electric field oscillation (in a mathematically strict sense, this requires $\tau \leq \pi/f_{diff}$, in praxis the data sampling rate should rather exceed twice the Nyquist limit to ensure reliable results); and (iii) the EOS signal has sufficient SNR throughout the delay range to extract the timing information, implying a non-vanishing amplitude for $E_{diff}$ over the full delay range.

The latter feature (iii) can be fulfilled by several means, indicated by the conditioning 23 in FIGS. 1B and 5. One particular advantage of the invention is that EOS is sensitive directly to the electric field $E_{diff}$ so that any attenuation a in the difference frequency arm that acts on the power level only affects the EOS signal as $\sqrt{a}$.

Possibilities to Condition $E_{diff}$ Such that it Covers the Full Delay Range Include (i) Generating an IPDFG signal with narrow spectral bandwidth. This can be either achieved already during nonlinear conversion, for example by using a thick nonlinear conversion crystal of the IPDFG medium 21, or by appropriately shaping the input pulses in time or frequency, or by appropriately filtering the difference frequency signal with a filter 23.

(ii) By using a spectrally broadband difference frequency electric field and chirping the pulse in time, thus stretching it to span the full delay range.

(iii) By exciting a long-lived atomic, molecular or other resonance in a sample, in particular a gas sample. Such excitation generates a well-defined resonance oscillation of the light electric field in the wake of the excitation pulse, whose emission is $\pi$-phase-shifted with respect to the excitation light field. While the transient sample response is not accessible in standard intensity absorption spectroscopy, electro-optic sampling is sensitive to the electric light field itself and observes the resonance-induced ringing in the wake of the excitation pulse [15]. The type of resonance depends on the wavelength of the IPDFG signal and the delay range. For picosecond delay ranges, narrow absorption resonances in the condensed phase can for example provide such signal, whereas nanosecond delay ranges can for example be covered by long-lived resonance oscillations in gas samples.

Figure 2:
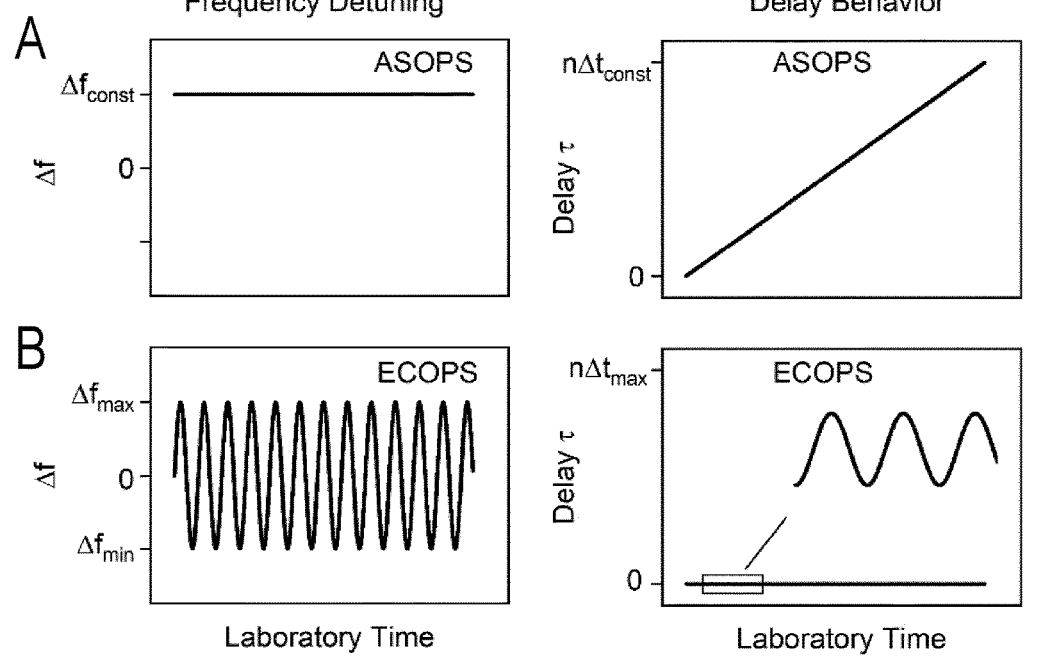
FIG. 2: two typical applications for dual-oscillator based delay scans.

FIG. 2 illustrates variants of dual-oscillator based delay scans, as outlined above. According to FIG. 2A, asynchronous optical sampling (ASOPS) uses a constant frequency detuning $\Delta f_{const}$ (left panel) to achieve a linear delay scan, where $\tau = n\Delta t_{const}$ is the current delay after n pulse pairs with a constant delay step size $\Delta t_{const}$. The maximum delay is equal to the repetition period of laser 1, $\tau_{max} = 1/f_1$. As shown in FIG. 2B, electronically controlled optical sampling (ECOPS) periodically modulates the frequency detuning $\Delta f$ between $\Delta f_{max}$ and $\Delta f_{min} = -\Delta f_{max}$. The delay $\tau$ follows the modulation of the frequency detuning, allowing multi-Kilohertz scan rates. The maximum delay $\tau_{max}$ (given by the cumulative sum of the varying delay steps per half-period of the oscillation) can be orders of magnitude smaller than for ASOPS.

Figure 3:
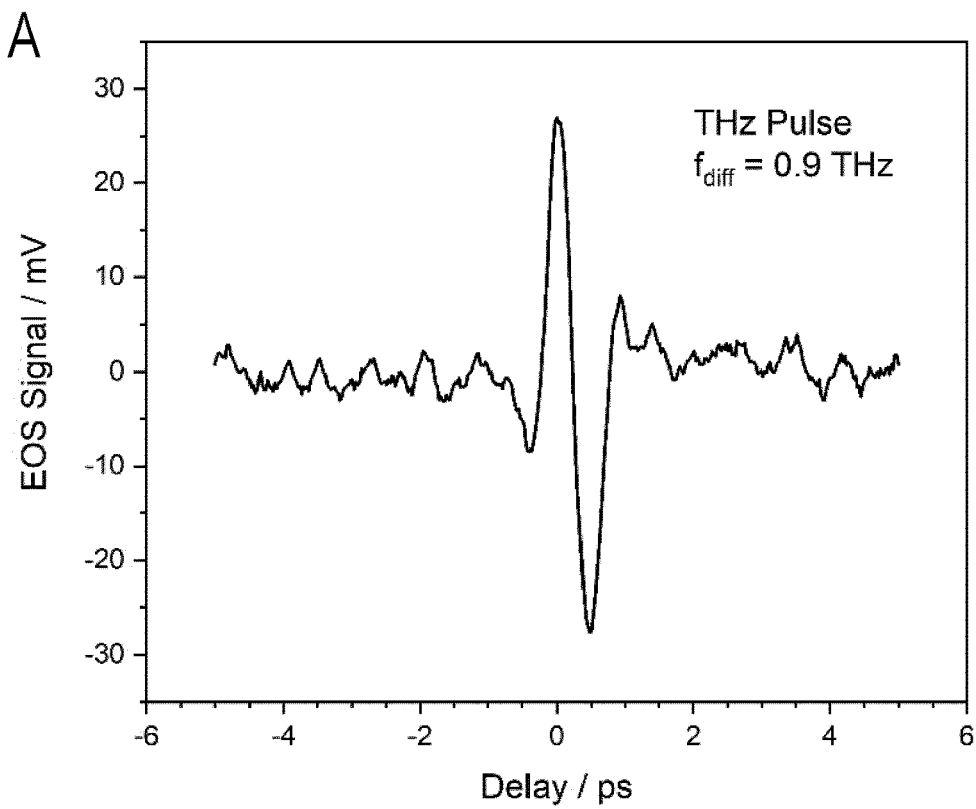
FIG. 3: experimental results illustrating EOS signal traces recorded with the inventive technique by the ASOPS-type scanning.
Figure 3:
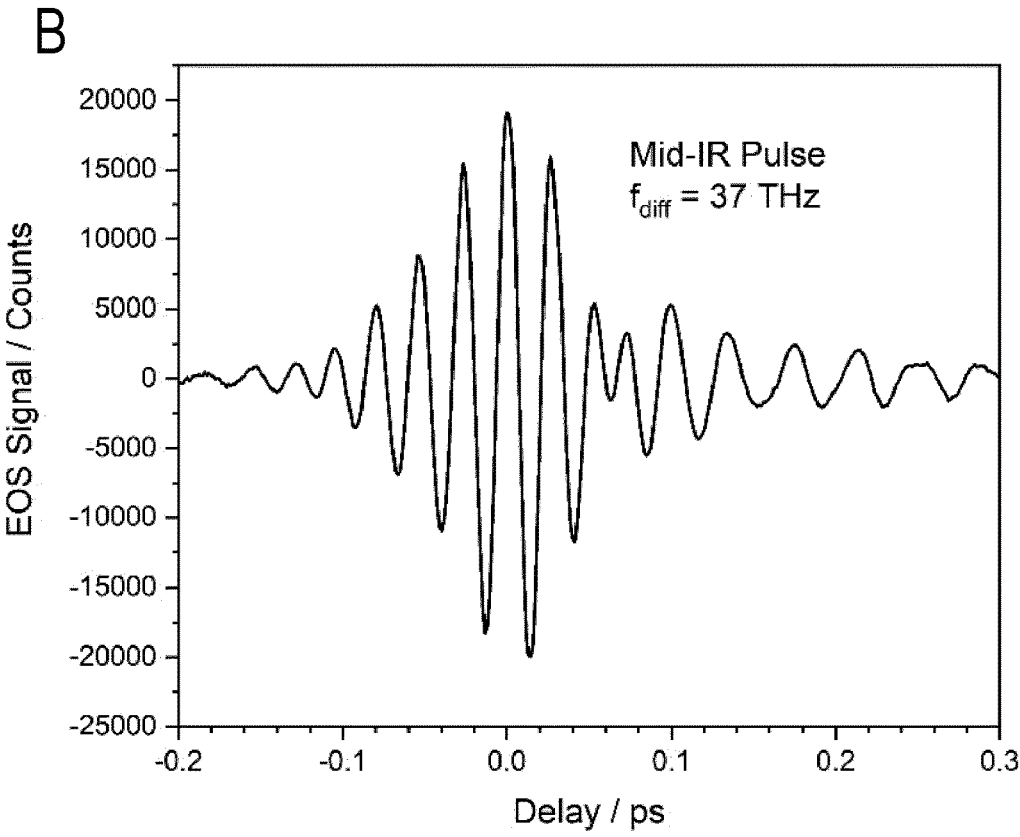

FIG. 3 shows two examples of EOS signal traces recorded with the inventive method by the ASOPS-type scanning, wherein the first and second pulse laser sequences 1, 2 (see FIG. 1) are generated with two separate free-running lasers. The first pulse laser sequence 1 is generated with an Yb:YAG disk laser producing 250-fs laser pulses 1A at 1030-nm center wavelength and 28-MHz repetition frequency. A second amplified Yb:fiber laser delivers 70 fs laser pulses 2A centered around 1560 nm that provides the second pulse laser sequence 2. The fiber laser has roughly twice the repetition frequency, with a slight frequency detuning, determining the step size $\Delta t$. The delay axis is deduced from the electronic beating of repetition frequency harmonics at around 2072 MHz.

FIG. 3A shows an example for an EOS trace of a THz pulse. In this case, intra-pulse difference frequency generation in a GaP nonlinear crystal of IPDFG medium 21 produces an IPDFG field 5 $E_{diff}$ with a carrier frequency $f_{diff}$ of 0.9 THz. The output pulses of the Yb:fiber laser are directly used as sampling pulses 6 to record the EOS trace with a pulse-to-pulse delay step size $\Delta t = 2.4$ fs. Another GaP crystal served as the nonlinear EOS medium 22 (see FIG. 5). The resulting delay sweep maps the difference electric field $E_{diff}$, as schematically described in FIG. 1B. At an SNR of 18 and a carrier frequency of $f_{diff} = 0.9$ THz, the delay of the zero-crossing can be determined with a precision of 10 fs within the acquisition integration time of 3 μs. This suggests that sub-femtosecond timing precision is reached with the current SNR at >300 μs integration time.

FIG. 3B shows an example for an EOS trace of a mid-infrared pulse. In order to produce the mid-infrared pulses with a carrier frequency of $f_{diff} = 37$ THz the Yb:YAG laser pulses are compressed in a nonlinear compression stage to 16 fs and focused into an LGS crystal for IPDFG. The Yb:fiber laser pulses are broadened and compressed in a highly nonlinear fiber to 12 fs duration and used to sample the mid-infrared pulses in GaSe as EOS medium. The trace is recorded with $\Delta t = 1.3$ fs. The data is recorded in this case on the single-laser-pulse level. Each data point represents the signal produced by a single laser pulse pair of the two laser pulse sequences, so that the acquisition time per data point is effectively 35.7 ns. Due to higher IPDFG and EOS efficiencies for mid-infrared pulses an SNR of 256 could be reached already with this acquisition time. Hence, according to equation (4) the delay of a zero crossing can be determined with a precision of 17 as in 35.7 ns, showing that sub-attosecond precision can be reached already with integration times above 10 µs.

Another feature of the acquired EOS trace is the tail following the main pulse in FIG. 3B. The signature originates from absorption of gases like water and $CO_2$ in air and lasts for multiple picoseconds up to multiple nanoseconds. Such signatures provide a convenient signal with known oscillation frequencies for delay calibration in a sweep experiment as depicted in FIG. 16.

Figure 4:
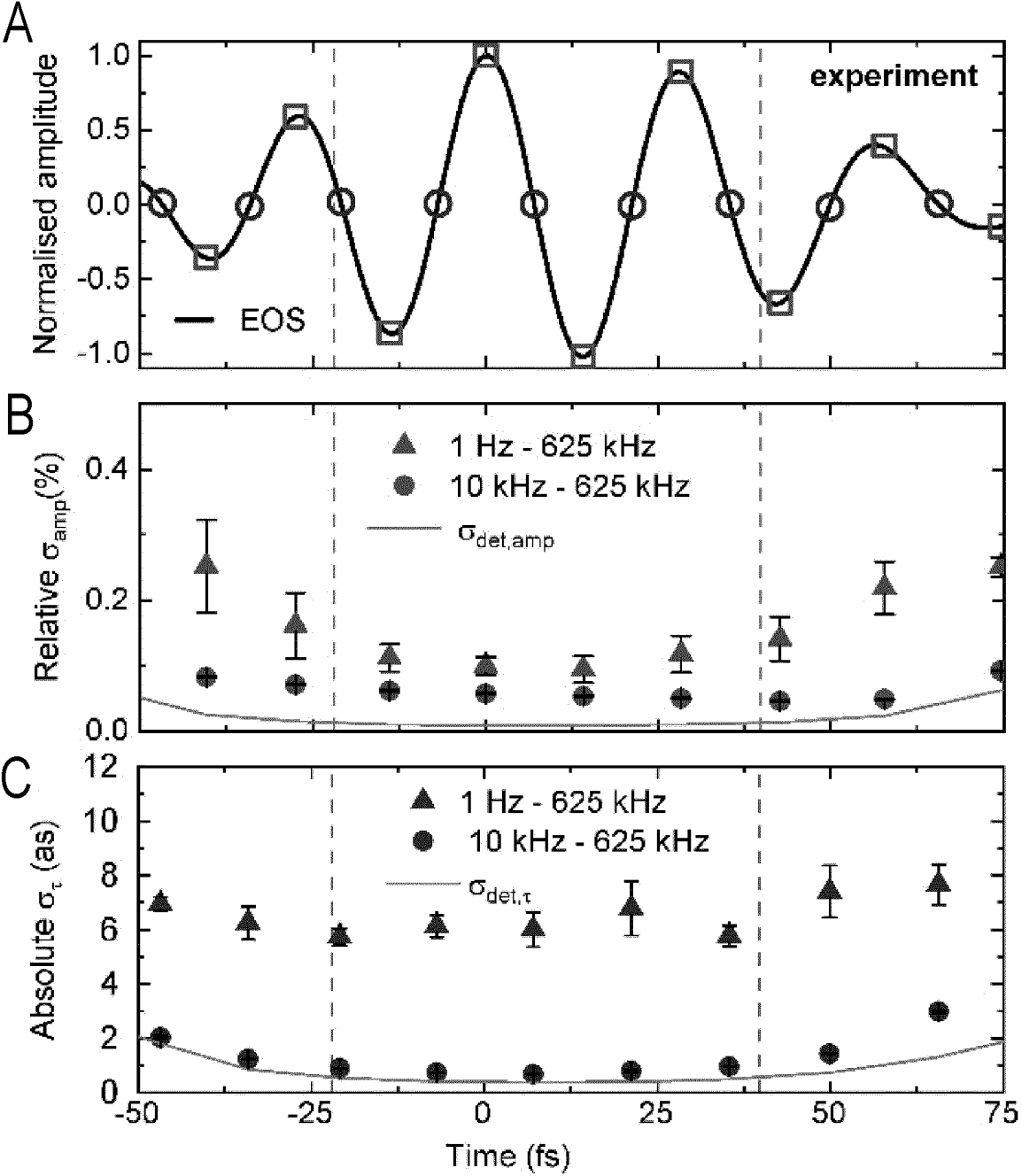
FIG. 4: experimental results illustrating waveform fluctuations from the EOS signal of a mid-infrared pulse.

FIG. 4 illustrates a measurement of waveform fluctuations from the EOS signal of a mid-infrared pulse with a carrier frequency of $\omega_{diff}$=37 THz. The mid-infrared pulses were generated with IPDFG under similar conditions as for the EOS trace in FIG. 3B. The pulse was generated by intra-pulse difference frequency generation from 16-fs, 1030-nm pulses in a nonlinear LGS crystal.

FIG. 4A shows the measured few-cycle EOS signal, mapping $E_{diff}$, oscillating with the mid-infrared carrier frequency of $f_{diff}$=37 THz. The laser pulse sequences 1 and 2 are derived from the same laser beam by using a beam splitter and a mechanical delay stage. IPDFG is typically orders of magnitude more efficient for mid-infrared pulse generation compared to THz pulse generation. The empty circles represent selected zero crossings, and the empty squares represent extrema positions. Area enclosed by the dashed vertical lines is a range of intensity full width at half maximum of the mid-infrared pulse.

FIG. 4B shows the measured amplitude noise across the pulse for the 1-Hz-to-0.625-MHz band (triangles) and for the 10-kHz-to-0.625-MHz band (circles). The solid curve underneath represents the detection limit for the measurement of relative amplitude fluctuations, determined by the dynamic range of EOS detection. FIG. 4C shows the temporal jitter for each selected zero-crossing of the EOS trace, in the 1-Hz-to-0.625-MHz band (triangles), and in the 10-kHz-to-0.625-MHz band (circles). The dots show the mean values and the error bars indicate the standard deviation of five measurements each. The solid curve represents the detection-limited sensitivity for timing jitter measurements. For the 1-Hz-to-0.625-MHz band, the zero-crossing positions were corrected with interferometric position data, while for the 10-kHz-to-0.625-MHz band no correction was performed.

Despite amplitude fluctuations D amp of the field maxima in the permille regime (panel B) (mainly dominated residual laser noise), the zero-crossings of the waveform are determined to be temporally stable to $\sigma_\tau \approx 8$ as in the 1 Hz-625 kHz band and even to <1 as in the 10 kHz-625 kHz band. The higher timing jitter for the 1 Hz-625 kHz band can be associated with mechanic modulation of the optical beam paths of pulse sequences 1 and 2 at acoustic frequencies, reducing the interferometric stability. The timing jitter at frequencies >10 kHz are close to the detector-limited sensitivity $\sigma_{det,\tau}$ (solid curve in FIG. 4C), which excludes any laser-induced amplitude fluctuations. As expected from equation (4) $\sigma_\tau$ and $\sigma_{det,\tau}$ change inversely with the amplitude distribution of the electric field oscillations.

Embodiments of the Laser Pulse Sequence Measuring Apparatus

FIG. 5 illustrates embodiments of the laser pulse sequence measuring apparatus configured for the implementation of the inventive method for measuring the timing jitter between two laser pulse sequences with independency of the involved light electric fields of the carrier envelope phase ($\psi_{CEP}$) of the pulses.

According to FIG. 5A, the laser pulse sequence measuring apparatus 100 comprises two pulse laser source devices 10, a delay signal generation device 20 and optionally a feedback control unit 30. The pulse laser source devices 10 comprise a first pulse laser source 11, e.g., a solid disk laser, like the Yb:YAG disk laser mentioned above, and a second pulse laser source 12, e.g., a fiber laser, like the Yb:fiber laser mentioned above. Both laser sources are operated separately as free running oscillators. The first and second pulse laser sources 11, 12 create the first and second laser pulse sequences 1, 2, resp.

The delay signal generation device 20 comprises the DFG medium 21, the EOS medium 22, an optional conditioning medium 23, including e.g., a spectral filter or an optical pulse stretcher, and an EOS signal polarization detector 24, e.g., including a Wollaston prim 24.1, photodiodes 24.2 and a subtraction signal processor 24.3.

The output laser pulses of the first pulse laser source 11, i.e. the first pulse laser sequence 1, carry a CEP $\psi_{CEP,1}$. IPDFG in the DFG medium 21 produces an electric field (see FIG. 1) that is independent of $\psi_{CEP,1}$. The first pulse laser sequence 1 generates the IPDFG field, for example in a nonlinear crystal. The most efficient process for IPDFG depends on the wavelengths of fundamental and IPDFG waves, and parameters like average laser power, pulse powers and bandwidth. Mid-infrared pulses can be generated efficiently via IPDFG of near-infrared lasers in nonlinear crystals, for example $LiGaS_2$ (LGS) for 1-µm systems (among them YAG-based lasers) [37], and GaSe [41] or ZnSe [42] for 2-µm laser systems. Pulses in the THz regime can be produced by IPDFG (optical rectification) in crystals like $LiNbO_3$[43], GaP[44] or GaAs [45].

The resulting IPDFG field $E_{diff}$(IPDFG pulses 4) optionally may be conditioned 23 for creating the phase-stable reference waveforms 5 to be sampled. Conditioning comprises for example spectral filtering, temporal chirping, or exciting a narrowband molecular, phonon or other resonance to achieve a temporally-stretched electric field for monitoring the timing in a delay sweep modus. As an example, conditioning with the conditioning medium 23 may be applied to stretch the IPDFG field to cover the delay span between the pulses of the first and second laser pulse sequences 1, 2. Conditioning of $E_{diff}$ may also occur already during its generation, for example due to phase matching conditions in the DFG medium 21. Alternatively, conditioning can be omitted and the phase-stable reference waveforms 5 to be sampled are directly provided by the IPDFG pulses 4 (see e.g. FIGS. 1 and 56).

The second laser pulse sequence 2 provides the sampling pulses 6 (electric field $E_{sampling}$) for EOS, which may also involve additional stages, for example for temporal compression (not shown). The laser pulses of the second laser pulse sequence 2 have a CEP $\psi_{CEP,2}$. The phase-stable reference waveforms 5 and the sampling pulses 6, i.e. $E_{diff}$ and $E_{sampling}$, are spatially combined using for example their spatial, spectral or polarization properties, for performing EOS in the EOS medium 22. The EOS signal is independent of the CEPS of laser pulse sequences 1 and 2. It is detected with the polarization-dependent detection in detector 24, for example by using the Wollaston prism 24.1. Balanced detection with the photodiodes 24.2 and the subtraction signal processor 24.3 improves the SNR by removing the influence of intensity noise from the second laser pulse sequences 2.

In a preferred implementation of EOS, $E_{diff}$ and $E_{sampling}$ are polarized along different directions, and interaction in the EOS medium 22 leads to polarization rotation of the sampling beam. Examples of suitable crystals of EOS medium for near-infrared sampling are GaSe for $E_{diff}$ in the mid-infrared range and GaP for $E_{diff}$ in the THz range [44]. A polarization-sensitive detection scheme measures the ellipticity imprinted by $E_{diff}$ on the sampling electric field. Preferably, balanced detection 24.3 is employed to remove the influence of intensity noise of pulse sequence 2 and reach the shot-noise limit, so that equation (5) is valid around the zero-crossings of the EOS signal.

The output of the detector 24 provides the EOS signal 7, on the basis of which the delay signal 3 is derived. Depending on the applications, the delay signal 3 can be provided e.g. by the EOS signal 7 as such, in case a linear relationship as in equation (3) holds, or by processing of the EOS signal 7, for example by applying equation (6) or a derivation thereof to calculate directly or derive by curve fitting or iterative procedures—potentially including a model of the delay generation process—the pulse-to-pulse delay advances.

For pulse sequences 1 and 2 having a periodic delay axis, like e.g. in ASOPS and ECOPS, with the period for the delay axis recurrence being an integer multiple n of the pulse-to-pulse delay of the phase-stable reference waveform 5, recording only the signal of every nth data point or post-selecting every $n^{th}$ point (for example with a field-programmable gate array) with the acquisition phase adjusted such that the selected points coincide with a predetermined zero transition generates a delay signal 3 that follows equation (3). Advantageously, the amount of data to be processed is substantially reduced with this embodiment, that is described with further details below with reference to FIG. 9.

The delay signal 3 can be used as an input of a feedback control unit 30, like a computer circuit, controlling the repetition rate of at least one of the first and second pulse laser sources 11, 12. Further applications of the delay signal 3 are described below.

FIG. 56 shows an alternative embodiment of the laser pulse sequence measuring apparatus 100 with the two pulse laser source devices 10 and the delay signal generation device 20. With this embodiment, IPDFG and EOS are performed in the same optical medium 21, 22. The optical medium 21, 22 can be a single nonlinear crystal. As an example, the same GaP crystal is suitable both to generate THz pulses from near-infrared pulses and to perform EOS of the THz field. Alternatively, the optical medium for simultaneous difference frequency generation and sampling may also be a combination of two different nonlinear crystals, placed in close proximity in the same combined beam of pulse sequence 1 and sampling pulses 6.

Applications of Measuring the Temporal Delay Between Two Laser Pulse Sequences

The delay-dependence of the measured EOS signal 7 can be utilized in several applications as outlined in an exemplary manner in the following.

In a first application example, the sampling pulses 6 are aligned temporally coinciding with a zero-crossing of the difference-frequency electric field (FIG. 1A). The recorded signal $S_{zc}(\tau)$ has the form of a typical biased error signal that can be used for active locking of the repetition frequencies and inter-pulse delays of the two laser pulse sequences. In the specific case of two laser pulse sequences 1 and 2 originating from two separate lasers 11, 12, a preferred embodiment of the invention is to feed the measured EOS signal 7 or the delay signal 3 derived therefrom into a proportional-integral-derivative (PID) loop, which controls a piezo stage that varies the position of a cavity mirror inside one of the lasers 11, 12 to synchronize both lasers to the same frequencies.

For pulse sequences 1 and 2 having a frequency detuning and a periodic delay axis, like e.g. in ASOPS and ECOPS, with the period for the delay axis recurrence being an integer multiple n of the pulse-to-pulse delay of the signal 5, recording only the signal of every nth data point or post-selecting every nth point (for example with a field-programmable gate array) with the acquisition phase adjusted, such that the selected data points coincide with a zero transition, generates an equivalent error signal that can be used with the PID loop.

In another application example, the inventive method is used to monitor the delay between corresponding pulses of two laser pulse sequences synchronized to the same repetition frequency, with the goal of either post-processing recorded spectroscopic or other data, or characterizing the residual timing jitter according to equation (3).

In a further application example, the inventive method is used to measure the delay between corresponding pulses of two laser pulse sequences with a constant or varying repetition frequency detuning $\Delta f$ by mapping the signal change $\Delta S$ onto a delay change $\tau$.

FIG. 6 illustrates an embodiment of a spectroscopic measuring apparatus 200 for a time domain spectroscopic measurement, which represents a preferred application of the invention. The spectroscopic measuring apparatus 200 comprises a laser pulse sequence measuring apparatus 100 according to an embodiment of the invention (see, e.g., FIG. 5), and a time domain spectroscopic measurement set-up 210. The laser pulse sequence measuring apparatus 100 comprises pulse laser source devices (not shown in FIG. 6) and the delay signal generation device 20 with the DFG medium 21, the optional conditioning medium 23, the EOS medium 22 and the EOS signal polarization detector 24. The time domain spectroscopic measurement set-up 210 includes a signal generation unit 213 and optionally linear or nonlinear optical conversion stages 211, 212.

The signal generation unit 213 is adapted for a spectroscopic experiment, where the experimental signal is independent on the CEP slip between pulse sequences 1 and 2. The signal generation unit 213 comprises, e.g., a sample holder including a sample to be investigated by irradiation with the first laser pulse sequence 1 and sampling the spectral response after the irradiation with the second laser pulse sequence 2. The conversion stages 211, 212, like, e.g., pulse compressors or stretchers can be used for preparing the pulses of the first and second laser pulse sequences 1, 2 for a particular spectroscopic measuring task at the signal generation unit 213.

The first and second laser pulse sequences 1 and 2 have a frequency detuning $\Delta f$, which is constant or is time-dependent. The frequency detuning $\Delta f$ leads to a recurring pulse-to-pulse advance in delay with a delay step $\Delta t$, which may vary in time. Beam splitters BS1 and BS2 send part of the beams of laser pulse sequences 1 and 2 to the delay detection described in FIG. 5A, and the EOS signal 7 provides the delay axis for the spectroscopic experiment. The time domain spectroscopic measurement set-up 210 uses the delay signal 3 derived from the EOS signal 7 from the detector 24 for creating a delay axis for the time domain spectroscopic measurement.

While linear interference spectroscopy is sensitive both to the carrier envelope phase relationship of the laser pulse sequences and the delay between the laser pulses of the two laser pulse sequences, several nonlinear methods are only delay dependent, with some representative examples are given in the following.

Difference frequency generation (DFG) between two spectral components from the same laser pulses intrinsically removes the carrier envelope phase dependence, as is used in the current invention [33]. The process can be achieved either within a single pulse (IPDFG)[37] or between two pulses originating from the same laser pulse, and is also inherent to the generation of the idler pulse in optical parametric amplification [36]. The inventive delay monitoring technique naturally accompanies dual-laser spectrometry using EOS of DFG fields like mid-IR or THz pulses [25]. Also, linear interference spectroscopy using two pulses created both by DFG is inherently free from the influence of the CEPS of the two pulse sequences. Furthermore, many nonlinear spectroscopies with multi-cycle pulses like pump-probe, CARS and others are only sensitive to the pulse intensity envelope, and thus to the delay of the two or more pulses, but not to their CEPS.

In the embodiment of FIG. 6, beam splitter BS1 and BS2 send parts of the laser pulse sequences 1 and 2 to a delay detection, analogue to the one described in FIG. 5A. Beam splitting can be achieved either by spectrally selective reflection of specific frequency components before or after additional conversion stages, or with polarizing beam splitters, or with polarization and spectrally-independent beam splitters, for example Fresnel reflections at glass surfaces.

The delay axis obtained from the EOS signal 7 corresponds directly to the delay axis of the spectroscopic experiment with the exception of variations of the optical beam paths, induced for example by mechanical instabilities. These path length differences can be additionally tracked interferometrically [39]. Furthermore, FIG. 4C shows that typically, path length variations mainly affect the frequency band above 10 kHz, so that fast single- or few-pulse detection electronics in combination with modulating $\Delta f$ in the multi-kHz regime can ensure spectroscopic traces with minimum intra-trace disturbance of the delay axis by path length variation. The laser pulse sequences may be prepared for the spectroscopic experiment with the conversion stages 211, 212 by altering the temporal or spectral properties of the pulses.

Figure 7:
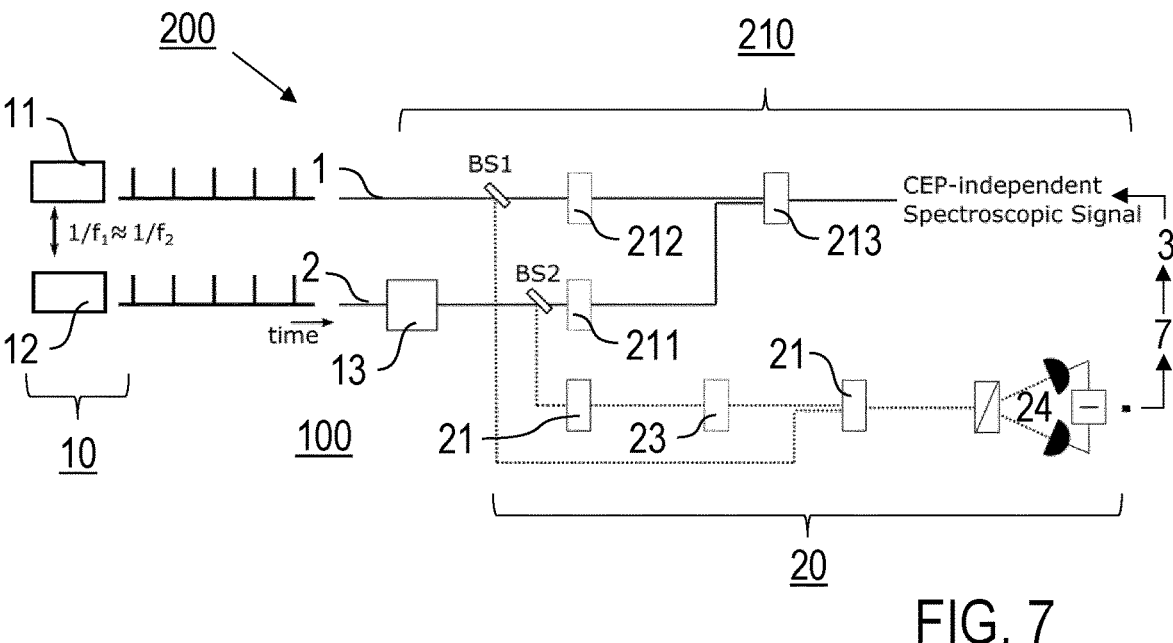
FIG. 7: a further application of the invention in a spectroscopy system using two mode-locked lasers.

FIG. 7 illustrates another embodiment of a spectroscopic measuring apparatus 200, which represents a further preferred application of the invention. The spectroscopic measuring apparatus 200 comprises a laser pulse sequence measuring apparatus 100 according to an embodiment of the invention (see, e.g., FIG. 5), and a spectroscopic measurement setup 210. The laser pulse sequence measuring apparatus 100 includes pulse laser source devices 10 with a first pulse laser source 11 and a second pulse laser source 12. Furthermore, a modulator 13 is provided for a fast modulation of the delay in the beam path of one of the laser pulse sequences, e.g., the second laser pulse sequence 2. As mentioned above, the pulses of the laser pulse sequences may be prepared for the spectroscopic signal generation in the signal generation unit 213 of the spectroscopic measurement setup 210 by additional linear or nonlinear optical conversion stages 211, 212. Examples are the same as given for the embodiment described with reference to FIG. 6.

The first and second pulse laser sources 11, 12 comprise mode-locked oscillators, which are synchronized in repetition frequency. The frequency synchronization may be implemented with conventional electronic or optical techniques and does not have to be tight, i.e. it is sufficient that $f_1 \approx f_2$. A delay scan is achieved in this embodiment by the fast delay modulator 13. Examples of such modulators providing up to multi-Kilohertz scan rates with picosecond delay ranges are acousto-optic programmable filters [7,8] and fast mechanical delay scanners, like ultrasonic sonotrodes [46]. Other parts of the spectroscopic setup 210 are as described in the embodiment of FIG. 6. Suitable beam splitter BS1 and BS2 send parts of laser pulse sequences 1 and 2 to the delay detection, analogue to the one described in FIG. 5A. The two pulse sequences are used for spectroscopy at the signal generation unit 213, with the spectroscopic experiment being independent of the CEP slip between the pulse sequences. The conversion stages 211, 212 may prepare the laser pulses in spectrum and/or temporal shape for the experiment. The obtained delay axis provided by the delay signal 3 captures not only the delay changes induced by the fast delay modulator 13, but also delay variation from the imperfect synchronization of the two pulse lasers sources 11, 12. In this way the delay axis can be obtained—depending on the SNR and EOS carrier frequency—with down to attosecond or sub-attosecond precision, even if the laser synchronization has orders of magnitude higher jitter.

Figure 8:
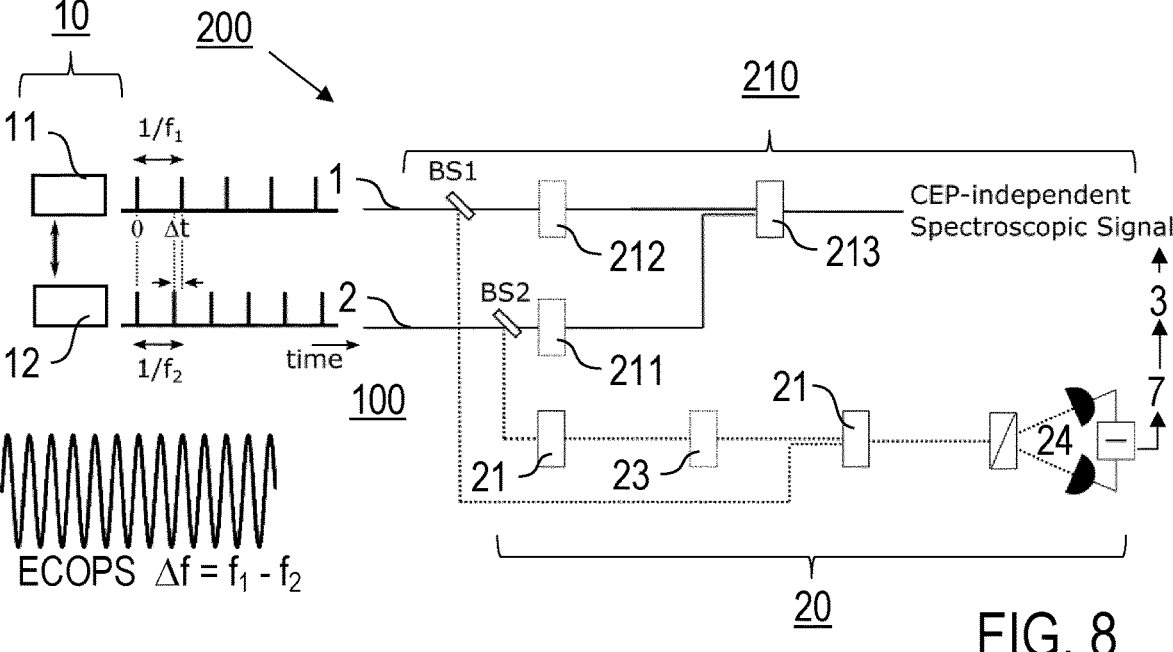
FIG. 8: a further application of the invention in an ECOPS-type spectroscopy system.

With a further application example, shown in FIG. 8, an ECOPS-type spectroscopic measurement system is provided by the spectroscopic measuring apparatus 200. As described above, the spectroscopic measuring apparatus 200 includes the laser pulse sequence measuring apparatus 100 according to an embodiment of the invention (see, e.g. FIG. 5), and a spectroscopic measurement setup 210. The pulse sequences are delivered by two separate pulse lasers sources 11, 12. One of the pulse lasers sources 11, 12 is actively locked in frequency to the other, with a periodically modulated frequency detuning $\Delta f$ of the pulse repetition frequencies. The modulation and lock can be for example achieved by mechanically moving an end mirror of one laser oscillator. ECOPS-type scanning is susceptible to mechanical and electronic noise. In the present embodiment the lock defining the momentary frequency relationship between the lasers may carry frequency jitter. The precise timing information is obtained according to the invention by the EOS detection. The oscillatory frequency relationship can be for example maintained by synchronizing both pulse lasers sources 11, 12 to the same repetition frequency with a sub-Kilohertz synchronization band, while applying a modulation of $\Delta f$ in the multi-Kilohertz regime. More involved electronic comparator methods may lead to better precision of the lock [2]. Other parts of the spectroscopic measuring apparatus 200 are as described in the embodiment of FIG. 6. Suitable beam splitter BS1 and BS2 send parts of laser pulse sequences 1 and 2 to the delay detection, analogue to the one described in FIG. 5A. The two laser pulse sequences 1, 2 are used for spectroscopy, with the spectroscopic experiment being independent of the CEP slip between the pulse sequences. Again, additional conversion stages 211, 212 may prepare the pulses in spectrum and/or temporal shape for the experiment at the signal generation unit 213.

The obtained delay axis captures the delay changes between the two laser pulse sequences 1, 2 including jitter introduced from an imperfect frequency lock. In this way the delay axis can be obtained—depending on the SNR and EOS carrier frequency—with down to attosecond or sub-attosecond precision, even if the modulated frequency lock of the two lasers has orders of magnitude higher jitter.

Figure 9:
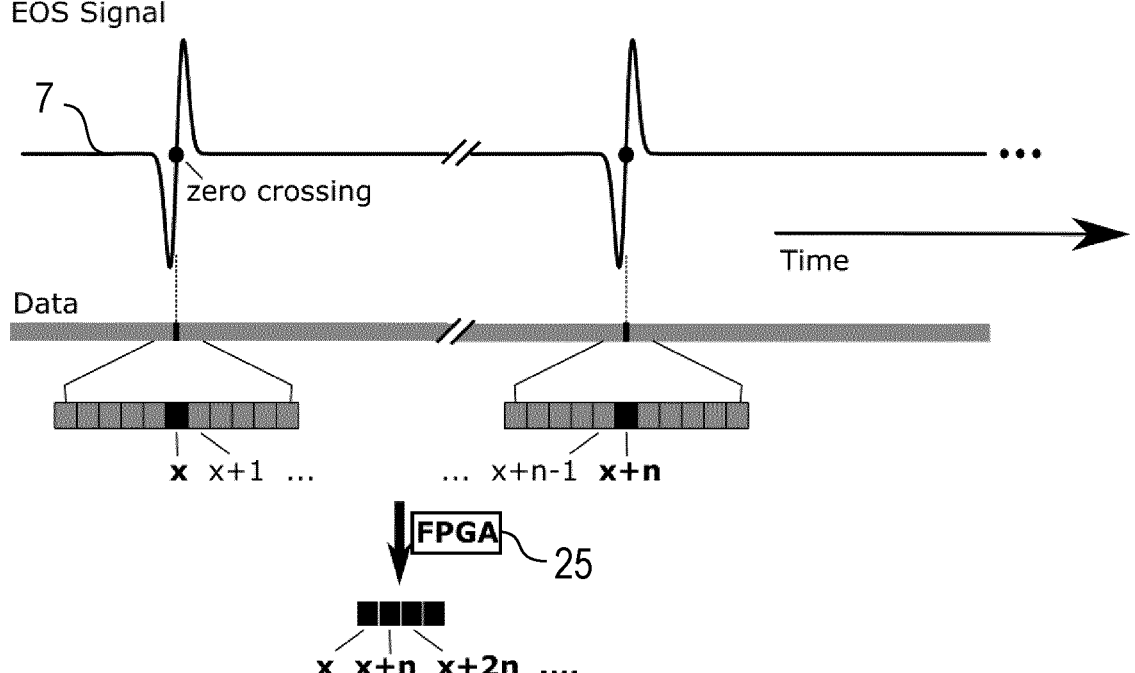
FIG. 9: an illustration of generating a delay feedback signal for a recurring delay scan (e.g., by ECOPS or ASOPS) by decimating the EOS signal of the phase-stable reference waveform.

FIG. 9 schematically illustrates extracting the timing jitter from the zero crossing of the EOS signal 7 waveform for two pulse sequences performing a periodic delay scan, with a period corresponding to a multiple integer n of the temporal separation of two data points. A field programmable gate array device (FPGA) 25 downsamples the measured data points in real time by a factor of n, so that only data points with indices x, x+n, x+2n ... I remain, wherein x is the time position of a predetermined zero-crossing of the EOS signal 7. The downsampled data points contain exclusively the EOS signals at the periodic zero crossings of the EOS waveform (real time zero-crossing signals).

If two pulse sequences with unequal pulse repetition frequencies ($f_1 \neq f_2$), possibly also with a modulated repetition frequency difference (ECOPS), perform a periodic delay scan over the EOS waveform (FIG. 9, top), and if further the period of scan recurrence is an integer multiple n of the temporal separation of two data points, the signal of a zero crossing with data acquisition index x will recur at x+n, and every nth data point thereafter. Decimating the acquired data points by a factor of n, starting at x leaves data points x, x+n, x+2n . . . , all coinciding with the zero crossings of the EOS waveform. This downsampled signal is thus sensitive to the timing jitter for the periodic synchronization of $f_1$ and $f_2$ following equations (3) and (4).

In the preferred embodiment decimation of the acquired data points by a factor of n is performed in real time by the use of the FPGA 25. The resulting signal (x, x+n, x+2n ... ) can be used for example as a feedback signal to control the synchronization of $f_1$ and $f_2$ to maintain the desired scanning periodicity, or to measure the timing jitter of an existing control loop.

The features of the invention disclosed in the above description, the drawings and the claims can be of significance individually, in combination or sub-combination for the implementation of the invention in its different embodiments.

The invention claimed is:

1. A laser pulse sequence measuring method for tracking a delay between a pair of pulses from two laser pulse sequences, said delay comprising a temporal separation between the pulses of said pair of pulses, said method comprising the steps of creating a first laser pulse sequence of first laser pulses and a second laser pulse sequence of second laser pulses, and generating a delay signal which is a quantitative measure of the delay between the pair of pulses from the first and second laser pulse sequences, wherein the step of generating the delay signal includes creating intra-pulse difference frequency generation pulses by applying intra-pulse difference frequency generation to the first laser pulses in a difference frequency generation medium, providing phase-stable reference waveforms based on the intra-pulse difference frequency generation pulses, and electro-optic sampling an electric field of the phase-stable reference waveforms with sampling pulses in an electro-optic sampling medium, wherein the sampling pulses are created based on the second laser pulses, for generating an electro-optic sampling signal, wherein the delay signal is obtained from the electro-optic sampling signal.

2. The laser pulse sequence measuring method according to claim 1, wherein the phase-stable reference waveforms are created by a bandwidth reduction of the intra-pulse difference frequency generation pulses.

3. The laser pulse sequence measuring method according to claim 2, wherein the bandwidth reduction is created with the intra-pulse difference frequency generation.

4. The laser pulse sequence measuring method according to claim 3, wherein the bandwidth reduction is created with the intra-pulse difference frequency generation by at least one of shaping the first laser pulses, setting phase matching conditions in the difference frequency generation medium and shaping the difference frequency generation medium.

5. The laser pulse sequence measuring method according to claim 2, wherein the bandwidth reduction is created after the intra-pulse difference frequency generation by filtering the intra-pulse difference frequency generation pulses.

6. The laser pulse sequence measuring method according to claim 1, wherein the phase-stable reference waveforms are created by applying a time chirp to the intra-pulse difference frequency generation pulses.

7. The laser pulse sequence measuring method according to claim 1, wherein the phase-stable reference waveforms are provided by a coherent sample resonance response being created via irradiating a resonant sample with the intra-pulse difference frequency generation pulses.

8. The laser pulse sequence measuring method according to claim 1, wherein the phase-stable reference waveforms are provided directly by the intra-pulse difference frequency generation pulses.

9. The laser pulse sequence measuring method according to claim 1, wherein the delay signal is obtained from zero-crossing sections of the electro-optic sampling signal.

10. The laser pulse sequence measuring method according to claim 9, wherein for the first and second laser pulse sequences having a periodic delay axis, with a period for a delay recurrence rate being an integer multiple n of a pulse-to-pulse delay, the delay signal is obtained as a downsampled delay signal by sampling the electro-optic sampling signal at zero-crossing sections thereof with the delay recurrence rate.

11. The laser pulse sequence measuring method according to claim 1, wherein the sampling pulses are provided directly by the second laser pulses or by compressing the second laser pulses.

12. The laser pulse sequence measuring method according to claim 1, wherein the phase-stable reference waveforms are at least one of infrared, mid-infrared, near-infrared and visible pulses.

13. The laser pulse sequence measuring method according to claim 1, wherein the phase-stable reference waveforms are THz pulses.

14. The laser pulse sequence measuring method according to claim 1, wherein the difference frequency generation medium and the electro-optic sampling medium comprise two optically non-linear crystals.

15. The laser pulse sequence measuring method according to claim 1, wherein a single optically non-linear crystal is used for providing both of the difference frequency generation medium and the electro-optic sampling medium.

16. The laser pulse sequence measuring method according to claim 1, wherein the delay signal is used for feedback-controlling a repetition frequency of at least one of the first and second laser pulse sequences.

17. The laser pulse sequence measuring method according to claim 16, wherein the delay signal is used for feedback-controlling the repetition frequency of at least one of the first and second laser pulse sequences so that they have equal repetition frequencies.

18. The laser pulse sequence measuring method according to claim 16, wherein the delay signal is used for feedback-controlling the repetition frequency of at least one of the first and second laser pulse sequences so that they have detuned repetition frequencies with a detuning $\Delta f$.

19. The laser pulse sequence measuring method according to claim 16, wherein for the first and second laser pulse sequences having a periodic delay axis, with a period for a delay recurrence rate being an integer multiple n of a pulse-to-pulse delay, the delay signal is obtained by sampling the electro-optic sampling signal at zero-crossing sections thereof with a delay recurrence rate and the delay signal is used for PID feedback-controlling the repetition frequency of at least one of the first and second laser pulse sequences.

20. A spectroscopic measuring method including a time domain spectroscopic measurement, wherein the laser pulse sequence measuring method of claim 1 is executed, and the first and second laser pulse sequences are used for the time domain spectroscopic measurement.

21. The spectroscopic measuring method according to claim 20, wherein the delay signal is used for creating a delay axis for the time domain spectroscopic measurement.

22. The spectroscopic measuring method according to claim 21, wherein the second laser pulse sequence is subjected to a delay modulation of the delay relative to the first laser pulse sequence.

23. The spectroscopic measuring method according to claim 21, wherein the second laser pulse sequence is subjected to a repetition frequency modulation relative to the first laser pulse sequence.

24. The spectroscopic measuring method according to claim 21, wherein the delay signal is used for post-processing output data of the time domain spectroscopic measurement.

25. A laser pulse sequence measuring apparatus being configured for tracking a delay between a pair of pulses from two laser pulse sequences, said delay comprising a temporal separation between the pulses of said pair of pulses, said apparatus comprising at least one pulse laser source device being arranged for creating a first laser pulse sequence of first laser pulses and a second laser pulse sequence of second laser pulses, and a delay signal generation device being arranged for generating a delay signal which is a quantitative measure of the delay between the pair of pulses from the first and second laser pulse sequences, wherein the delay signal generation device includes a difference frequency generation medium and an electro-optic sampling medium, the difference frequency generation medium is arranged for creating intra-pulse difference frequency generation pulses by applying intra-pulse difference frequency generation to the first laser pulses, the delay signal generation device is configured for providing phase-stable reference waveforms based on the intra-pulse difference frequency generation pulses, and the electro-optic sampling medium is arranged for electro-optic sampling an electric field of the phase-stable reference waveforms with sampling pulses being derived from the second laser pulses, for generating an electro-optic sampling signal, wherein the delay signal is obtained from the electro-optic sampling signal.

26. The laser pulse sequence measuring apparatus according to claim 25, wherein the delay signal generation device is configured for creating the phase-stable reference waveforms by a bandwidth reduction of the intra-pulse difference frequency generation pulses.

27. A spectroscopic measuring apparatus being configured for a time domain spectroscopic measurement, including the laser pulse sequence measuring apparatus according to claim 26, being arranged for creating the first and second laser pulse sequences, and a time domain spectroscopic measurement set-up being configured for using the first and second laser pulse sequences for the time domain spectroscopic measurement.

28. The spectroscopic measuring apparatus according to claim 27, wherein the time domain spectroscopic measurement setup is configured for using the delay signal for creating a delay axis for the time domain spectroscopic measurement.

29. The spectroscopic measuring apparatus according to claim 28, wherein the second laser source device of the laser source apparatus is configured for at least one of a delay modulation and a repetition frequency modulation of the second laser pulse sequence.

30. The spectroscopic measuring apparatus according to claim 27, wherein the time domain spectroscopic measurement set-up is configured for using the delay signal for post-processing output data of the time domain spectroscopic measurement.

31. The laser pulse sequence measuring apparatus according to claim 26, wherein the delay signal generation device is configured for creating the bandwidth reduction with the intra-pulse difference frequency generation.

32. The laser pulse sequence measuring apparatus according to claim 31, wherein the delay signal generation device is configured for creating the bandwidth reduction with the intra-pulse difference frequency generation by at least one of shaping the first laser pulses, setting phase matching conditions in the difference frequency generation medium and shaping the difference frequency generation medium.

33. The laser pulse sequence measuring apparatus according to claim 26, wherein the delay signal generation device is configured for creating the bandwidth reduction after the intra-pulse difference frequency generation by filtering the intra-pulse difference frequency generation pulses.

34. The laser pulse sequence measuring apparatus according to claim 25, wherein the delay signal generation device is configured for creating the phase-stable reference waveforms by applying a time chirp to the intra-pulse difference frequency generation pulses.

35. The laser pulse sequence measuring apparatus according to claim 25, wherein the delay signal generation device is configured for providing the phase-stable reference waveforms by a coherent sample resonance response being created via irradiating a resonant sample with the intra-pulse difference frequency generation pulses.

36. The laser pulse sequence measuring apparatus according to claim 25, wherein the delay signal generation device is configured for providing the phase-stable reference waveforms directly by the intra-pulse difference frequency generation pulses.

37. The laser pulse sequence measuring apparatus according to claim 25, wherein the delay signal generation device is configured for obtaining the delay signal from zero-crossing sections of the electro-optic sampling signal.

38. The laser pulse sequence measuring apparatus according to claim 37, wherein for the first and second laser pulse sequences having a periodic delay axis, with a period for a delay recurrence rate being an integer multiple n of a pulse-to-pulse delay, the delay signal generation device is configured for obtaining the delay signal as a downsampled delay signal by sampling the electro-optic sampling signal at the zero-crossing sections thereof with the delay recurrence rate.

39. The laser pulse sequence measuring apparatus according to claim 25, wherein the delay signal generation device is configured for providing the sampling pulses directly by the second laser pulses or by compressing the second laser pulses.

40. The laser pulse sequence measuring apparatus according to claim 25, wherein the phase-stable reference waveforms are at least one of infrared and mid-infrared pulses.

41. The laser pulse sequence measuring apparatus according to claim 25, wherein the phase-stable reference waveforms are THz pulses.

42. The laser pulse sequence measuring apparatus according to claim 25, wherein the difference frequency generation medium and the electro-optic sampling medium comprise two optically non-linear crystals.

43. The laser pulse sequence measuring apparatus according to claim 25, wherein the difference frequency generation medium and the electro-optic sampling medium comprise a single optically non-linear crystal.

44. The laser pulse sequence measuring apparatus according to claim 25, wherein the delay signal generation device is configured for using the delay signal for feedback-controlling a repetition frequency of one of the first and second laser pulse sequences.

45. The laser pulse sequence measuring apparatus according to claim 44, wherein the delay signal generation device is configured for using the delay signal for feedback-controlling the repetition frequency of one of the first and second laser pulse sequences so that they have equal repetition frequencies.

46. The laser pulse sequence measuring apparatus according to claim 44, wherein the delay signal generation device is configured for using the delay signal for feedback-controlling the repetition frequency of one of the first and second laser pulse sequences so that they have detuned repetition frequencies with a detuning $\Delta f$.

47. The laser pulse sequence measuring apparatus according to claim 44, wherein for the first and second laser pulse sequences having a periodic delay axis, with a period for a delay recurrence rate being an integer multiple n of a pulse-to-pulse delay, the delay signal generation device is configured for obtaining the delay signal by sampling the electro-optic sampling signal at zero-crossing sections thereof with the delay recurrence rate and using the delay signal for PID feedback-controlling the repetition frequency of at least one of the first and second laser pulse sequences.

* * * * *